United States Patent
Kim et al.

(10) Patent No.: US 10,555,294 B2
(45) Date of Patent: *Feb. 4, 2020

(54) METHOD OF TRANSMITTING AND RECEIVING DOWNLINK SIGNAL IN WIRELESS COMMUNICATION SYSTEM AND APPARATUS THEREFOR

(71) Applicant: LG ELECTRONICS INC., Seoul (KR)

(72) Inventors: Kijun Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/384,566

(22) Filed: Apr. 15, 2019

(65) Prior Publication Data

US 2019/0246381 A1 Aug. 8, 2019

Related U.S. Application Data

(63) Continuation of application No. 16/115,063, filed on Aug. 28, 2018, which is a continuation of application
(Continued)

(51) Int. Cl.
*H04W 72/04* (2009.01)
*H04B 7/06* (2006.01)
*H04L 5/00* (2006.01)

(52) U.S. Cl.
CPC .......... *H04W 72/042* (2013.01); *H04B 7/068* (2013.01); *H04B 7/0684* (2013.01);
(Continued)

(58) Field of Classification Search
CPC ..... H04B 7/068; H04B 7/0684; H04L 5/0048; H04L 5/005; H04L 5/0053; H04W 72/0446; H04W 72/0473; H04W 72/042
See application file for complete search history.

(56) References Cited

U.S. PATENT DOCUMENTS

2011/0317657 A1* 12/2011 Chmiel .................. H04L 5/001
370/331
2011/0319109 A1* 12/2011 Kang ..................... H04L 5/001
455/507
(Continued)

FOREIGN PATENT DOCUMENTS

WO 2013168901 11/2013
WO 2013185580 12/2013

OTHER PUBLICATIONS

U.S. Appl. No. 15/120,733, Notice of Allowance dated May 14, 2018, 3 pages.
(Continued)

*Primary Examiner* — Chi H Pham
*Assistant Examiner* — Weibin Huang
(74) *Attorney, Agent, or Firm* — Lee Hong Degerman Kang Waimey

(57) ABSTRACT

According to one embodiment of the present invention, a method of receiving a downlink signal, which is received by a user equipment in a wireless communication system, includes the steps of receiving a TxPowerResourceConfigList for a user equipment which is not configured with a transmission mode 10 and one or more zeroTxPowerResourceConfigLists and receiving a DCI (downlink control channel) including a PRI (PDSCH RE mapping indicator). In this case, the user equipment can recognize whether a PDSCH (physical downlink shared channel) is mapped to REs (resource elements) to which a CSI-RS is transmittable using the one or more zeroTxPowerResourceConfigLists and the PRI.

6 Claims, 16 Drawing Sheets

Related U.S. Application Data

No. 15/120,733, filed as application No. PCT/KR2015/002077 on Mar. 4, 2015, now Pat. No. 10,104,649.

(60) Provisional application No. 61/947,951, filed on Mar. 4, 2014.

(52) U.S. Cl.
CPC ............ *H04L 5/005* (2013.01); *H04L 5/0048* (2013.01); *H04L 5/0053* (2013.01); *H04W 72/0446* (2013.01); *H04W 72/0473* (2013.01); *H04L 5/0035* (2013.01)

(56) References Cited

U.S. PATENT DOCUMENTS

| | | | | |
|---|---|---|---|---|
| 2012/0264441 A1* | 10/2012 | Chandrasekhar | ..... | H04L 5/0096 455/450 |
| 2012/0287875 A1 | 11/2012 | Kim et al. | | |
| 2013/0094384 A1 | 4/2013 | Park et al. | | |
| 2014/0036796 A1* | 2/2014 | Etemad | ................... | H04W 4/70 370/329 |
| 2014/0092878 A1* | 4/2014 | Davydov | ................ | H04W 4/70 370/336 |
| 2014/0126496 A1* | 5/2014 | Sayana | .................. | H04B 7/024 370/329 |
| 2014/0133395 A1* | 5/2014 | Nam | .................... | H04B 7/0452 370/328 |
| 2014/0302863 A1* | 10/2014 | Chen | .................... | H04W 24/02 455/452.1 |
| 2014/0321370 A1 | 10/2014 | Chen et al. | | |
| 2015/0131603 A1* | 5/2015 | Kim | ..................... | H04L 5/0005 370/330 |
| 2015/0173049 A1* | 6/2015 | Chen | ................... | H04W 72/082 370/329 |
| 2015/0181572 A1* | 6/2015 | Guo | ..................... | H04L 5/0048 370/312 |
| 2016/0173262 A1* | 6/2016 | Davydov | .............. | H04L 1/0075 370/329 |
| 2017/0064675 A1 | 3/2017 | Kim et al. | | |
| 2019/0053207 A1 | 2/2019 | Kim et al. | | |

OTHER PUBLICATIONS

U.S. Appl. No. 15/120,733, Office Action dated Oct. 6, 2017, 16 pages.

Panasonic, "Remaining details of EPDCCH starting symbol configuration," 3GPP TSG-RAN WG1 #71, R1-124785, Nov. 2012, 4 pages.

New Postcom, "Remaining details of PDSCH rate matching," 3GPP TSG-RAN WG1 #71, R1-124799, Nov. 2012, 4 pages.

PCT International Application No. PCT/KR2015/002077, Written Opinion of the International Searching Authority dated May 28, 2015, 9 pages.

U.S. Appl. No. 16/115,063, Office Action dated Apr. 4, 2019, 28 pages.

3GPP: Section 6.10.5.3 of 3GPP TS 36.211 V12.5.0, Release 12, Mar. 2015, 1 page.

United States Patent and Trademark Office U.S. Appl. No. 16/115,063, Notice of Allowance dated Oct. 24, 2019, 19 pages.

* cited by examiner

FIG. 5
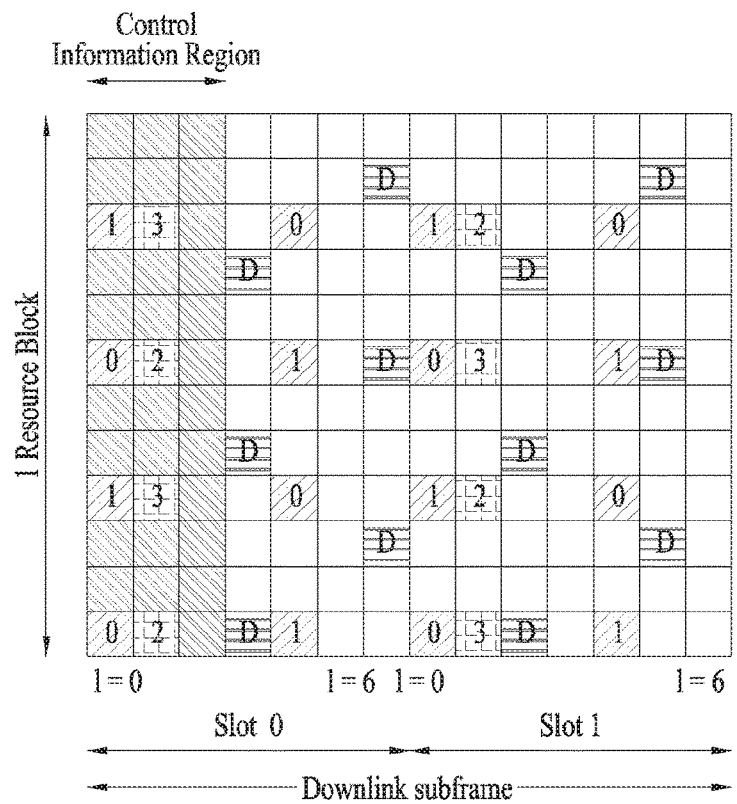
(a)
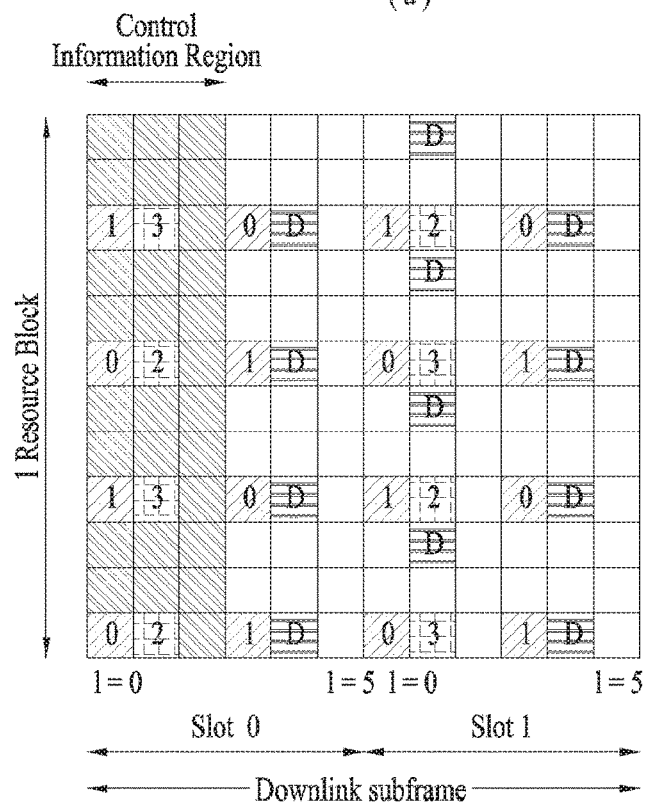
(b)

FIG. 11
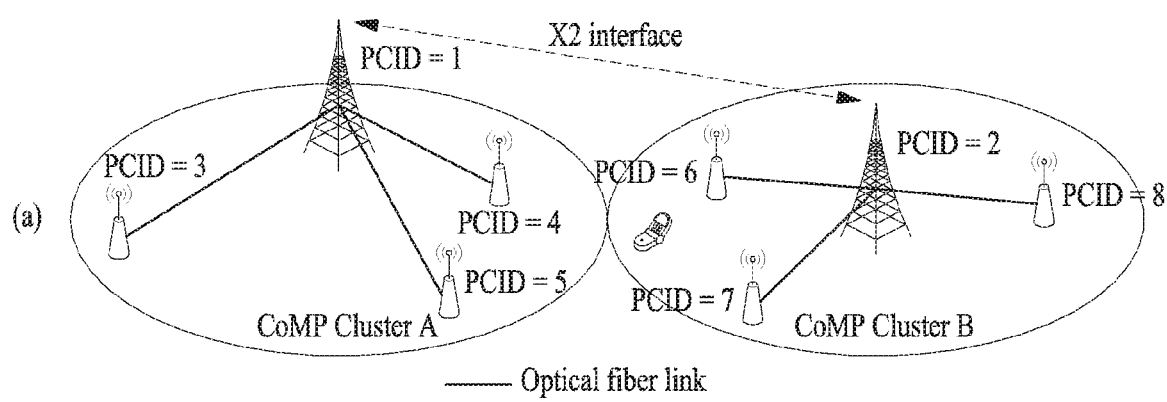
(a)
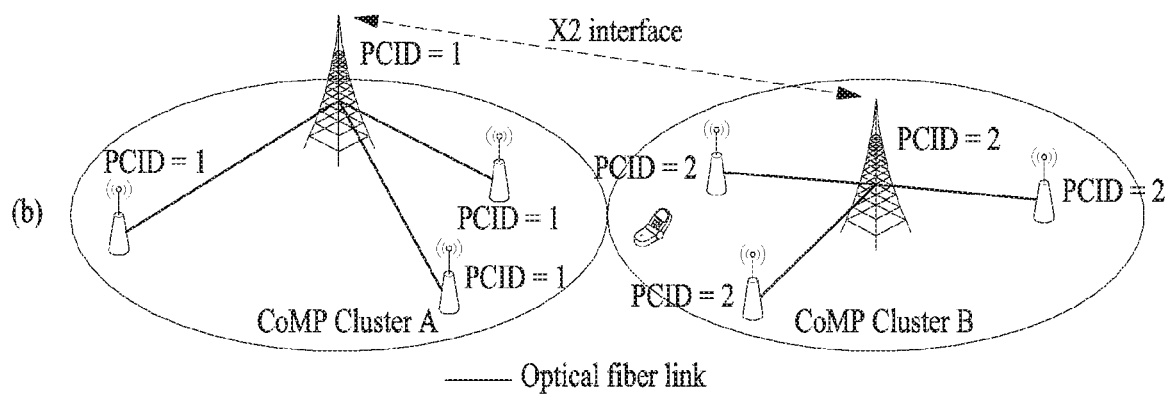
(b)

|  | 1st X-port | 2nd X-port | 3rd X-port | 4th X-port | 5th X-port | 6th X-port | 7th X-port | 8th X-port | 9th X-port | 10th X-port |
|---|---|---|---|---|---|---|---|---|---|---|
| List 1 | 0 | 0 | 0 | 0 | 1 | 1 | 0 | 0 | 1 | 0 |
| List 2 | 0 | 1 | 1 | 0 | 0 | 0 | 0 | 0 | 0 | 0 |
| List 3 | 1 | 0 | 0 | 1 | 1 | 0 | 0 | 1 | 0 | 0 |

FIG. 17

| List | 1st X-port | 2nd X-port | 3rd X-port | 4th X-port | 5th X-port | 6th X-port | 7th X-port | 8th X-port | 9th X-port | 10th X-port |
|---|---|---|---|---|---|---|---|---|---|---|
| | 0 | 0 | 0 | 0 | 1 | 1 | 0 | 0 | 1 | 0 |

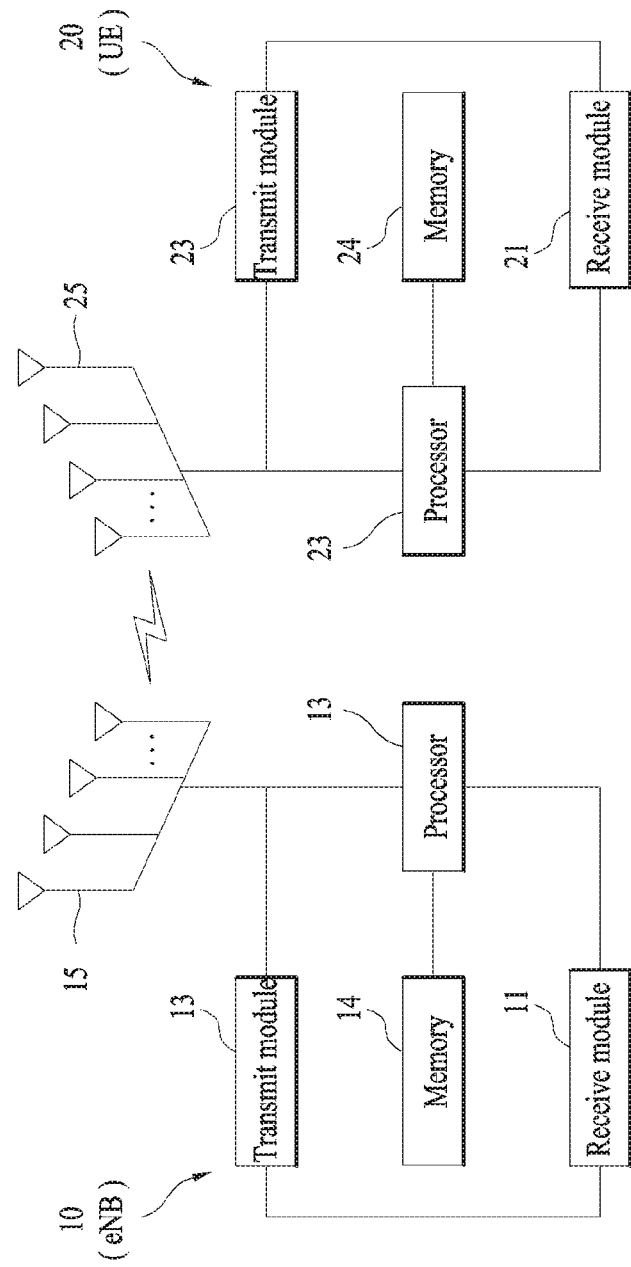

METHOD OF TRANSMITTING AND RECEIVING DOWNLINK SIGNAL IN WIRELESS COMMUNICATION SYSTEM AND APPARATUS THEREFOR

CROSS-REFERENCE TO RELATED APPLICATIONS

This application is a continuation of U.S. patent application Ser. No. 16/115,063, filed on Aug. 28, 2018, currently pending, which is a continuation of U.S. patent application Ser. No. 15/120,733, filed on Aug. 22, 2016, now U.S. Pat. No. 10,104,649, which is the National Stage filing under 35 U.S.C. 371 of International Application No. PCT/KR2015/002077, filed on Mar. 4, 2015, which claims the benefit of U.S. Provisional Application No. 61/947,951, filed on Mar. 4, 2014, the contents of which are all incorporated by reference herein in their entirety.

TECHNICAL FIELD

Following description relates to a wireless communication system, more particularly, to a method of transmitting and receiving a downlink signal and an apparatus therefor.

BACKGROUND ART

Wireless communication systems are widely deployed to provide various kinds of communication content such as voice and data. Generally, these communication systems are multiple access systems capable of supporting communication with multiple users by sharing available system resources (e.g., bandwidth and transmission power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

Technical Task

A technical task of the present invention is to dynamically inform of whether data is mapped to a resource element for a channel state information reference signal.

Technical tasks obtainable from the present invention are non-limited the above-mentioned technical task. And, other unmentioned technical tasks can be clearly understood from the following description by those having ordinary skill in the technical field to which the present invention pertains.

Technical Solution

According to one embodiment of the present invention, a method of receiving a downlink signal, which is received by a user equipment in a wireless communication system, includes the steps of receiving a TxPowerResourceConfigList for a user equipment which is not configured with a transmission mode 10 and one or more zeroTxPowerResourceConfigLists and receiving a DCI (downlink control channel) including a PRI (PDSCH RE mapping indicator), wherein the user equipment recognizes whether a PDSCH (physical downlink shared channel) is mapped to REs (resource elements) to which a CSI-RS is transmittable using the one or more zeroTxPowerResourceConfigLists and the PRI.

Each bit of the PRI can sequentially indicate whether the one or more zeroTxPowerResourceConfigLists are applied.

The zeroTxPowerResourceConfigList may correspond to a bitmap, each bit of the bitmap may indicate whether the PDSCH is mapped to REs corresponding to an X-port and REs position in which a zero-power CSI-RS is transmittable may be assigned to the X-port.

If two or more zeroTxPowerResourceConfigList are applied by the PRI, the user equipment may assume that the PDSCH is mapped to REs only corresponding to an X-port set to 0 in all of the two or more zeroTxPowerResourceConfigList.

If a bit value of the bitmap corresponds to 1, the user equipment may assume that the PDSCH is not mapped to REs corresponding to an X-port.

The TxPowerResourceConfigList for the user equipment which is not configured with the transmission mode 10 is periodically transmitted and the one or more zeroTxPowerResourceConfigLists can be aperiodically transmitted.

Time taken for changing the zeroTxPowerResourceConfigList may be longer than time taken for changing the PRI.

According to a different embodiment of the present invention, a method of transmitting a downlink signal, which is transmitted by an eNode B in a wireless communication system, includes the steps of transmitting a TxPowerResourceConfigList for a user equipment which is not configured with a transmission mode 10 and one or more zeroTxPowerResourceConfigLists and transmitting a DCI (downlink control channel) including a PRI (PDSCH RE mapping indicator), wherein the eNode B indicates whether a PDSCH (physical downlink shared channel) is mapped to REs (resource elements) to which a CSI-RS is transmittable using the one or more zeroTxPowerResourceConfigLists and the PRI.

Each bit of the PRI can sequentially indicate whether the one or more zeroTxPowerResourceConfigLists are applied.

The zeroTxPowerResourceConfigList may correspond to a bitmap, each bit of the bitmap may indicate whether the PDSCH is mapped to REs corresponding to an X-port and REs position in which a zero-power CSI-RS is transmittable may be assigned to the X-port.

If the PRI indicates application of two or more zeroTxPowerResourceConfigList, the eNode B can set all bits corresponding to an X-port, which corresponds to REs to which the PDSCH is mapped, to 0 in the two or more zeroTxPowerResourceConfigList.

If the PDSCH is not mapped to the RE corresponding to the X-port, the eNode B can set a bit corresponding to the X-port to 1.

The TxPowerResourceConfigList for the user equipment which is not configured with the transmission mode 10 can be periodically transmitted and the one or more zeroTxPowerResourceConfigLists can be aperiodically transmitted.

Time taken for changing the zeroTxPowerResourceConfigList may be longer than time taken for changing the PRI.

Advantageous Effects

According to the present invention, a base station can dynamically utilize a resource for a channel state information reference signal and a user equipment can receive data by precisely recognizing a dynamic change of the resource.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention, illustrate embodiments of the invention and together with the description serve to explain the principle of the invention. In the drawings:

FIG. 5 illustrates a reference signal;

FIG. 11 is a diagram illustrating a coordinated multi-point cluster to which an embodiment of the present invention is applicable;

FIG. 13 illustrates aperiodic CSI-RS transmission according to one embodiment of the present invention;

FIGS. 16 to 17 are diagrams illustrating a dynamic change of a CSI-RS resource according to embodiment of the present invention;

FIG. 18 is a diagram illustrating a configuration of a transmission and reception device.

MODE FOR INVENTION

Best Mode for Invention

Figure 1:
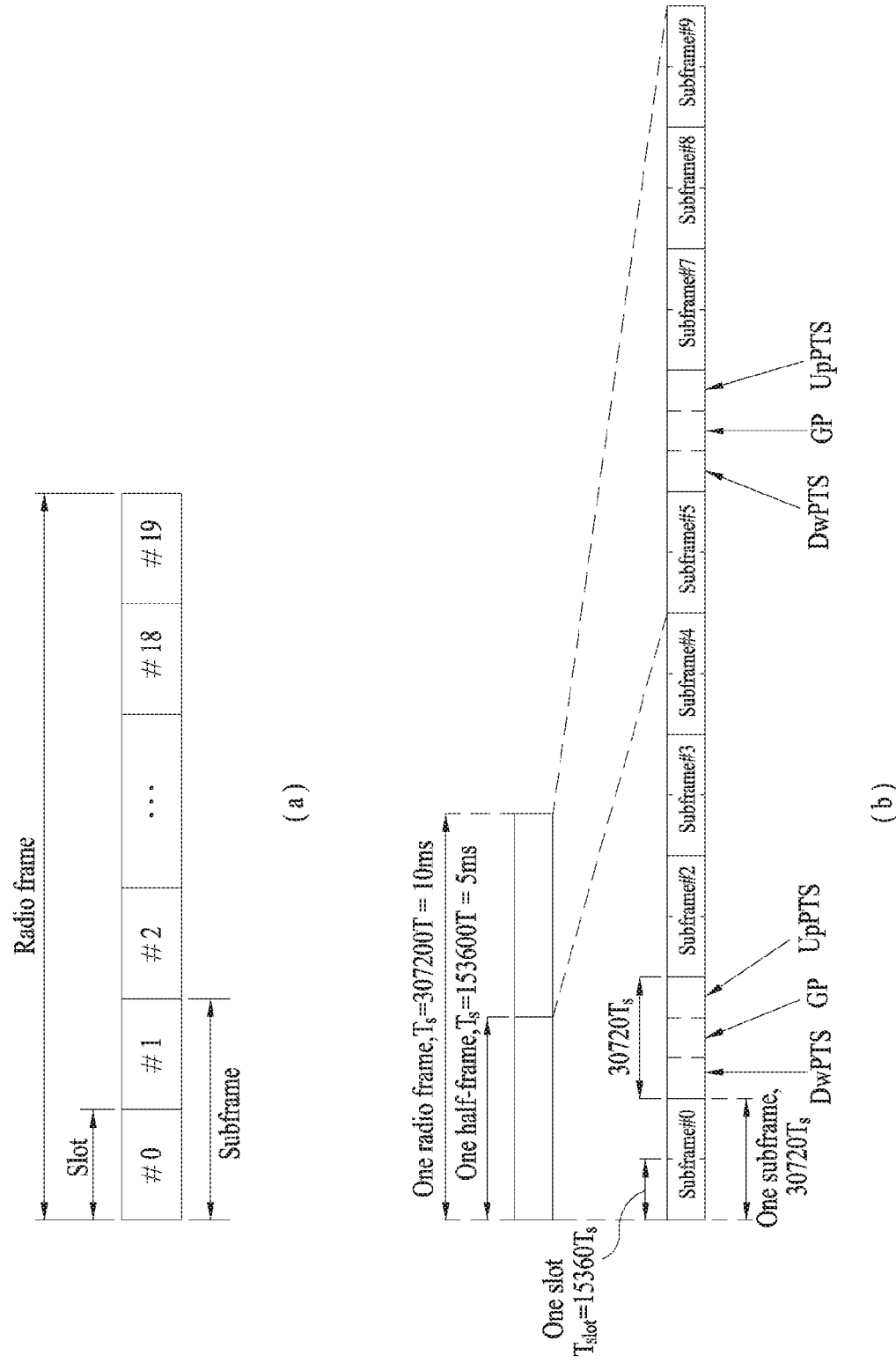
FIG. 1 illustrates a radio frame structure.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "mobile station (MS)," "mobile subscriber station (MSS)" and "subscriber station (SS)". The name "cell" adopted in the following descriptions may be applied to transmission/reception points such as a base station (or eNB), a sector, a remote radio head (RRH), and a relay, and may be used a general term to identify a component carrier at a specific transmission/reception point.

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and IEEE 802.16m advanced (wirelessMAN-OFDMA advanced system). For clarity, the following description focuses on 3GPP LTE and 3GPP LTE-A systems. However, the spirit of the present invention is not limited thereto.

LTE/LET-A Resource Structure/Channel

Hereinafter, a radio frame structure will be described with reference to FIG. 1.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE employs OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol is extended and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

The illustrated radio frame structures are merely examples, and various modifications may be made to the number of subframes included in a radio frame, the number of slots included in a subframe, or the number of symbols included in a slot.

Figure 2:
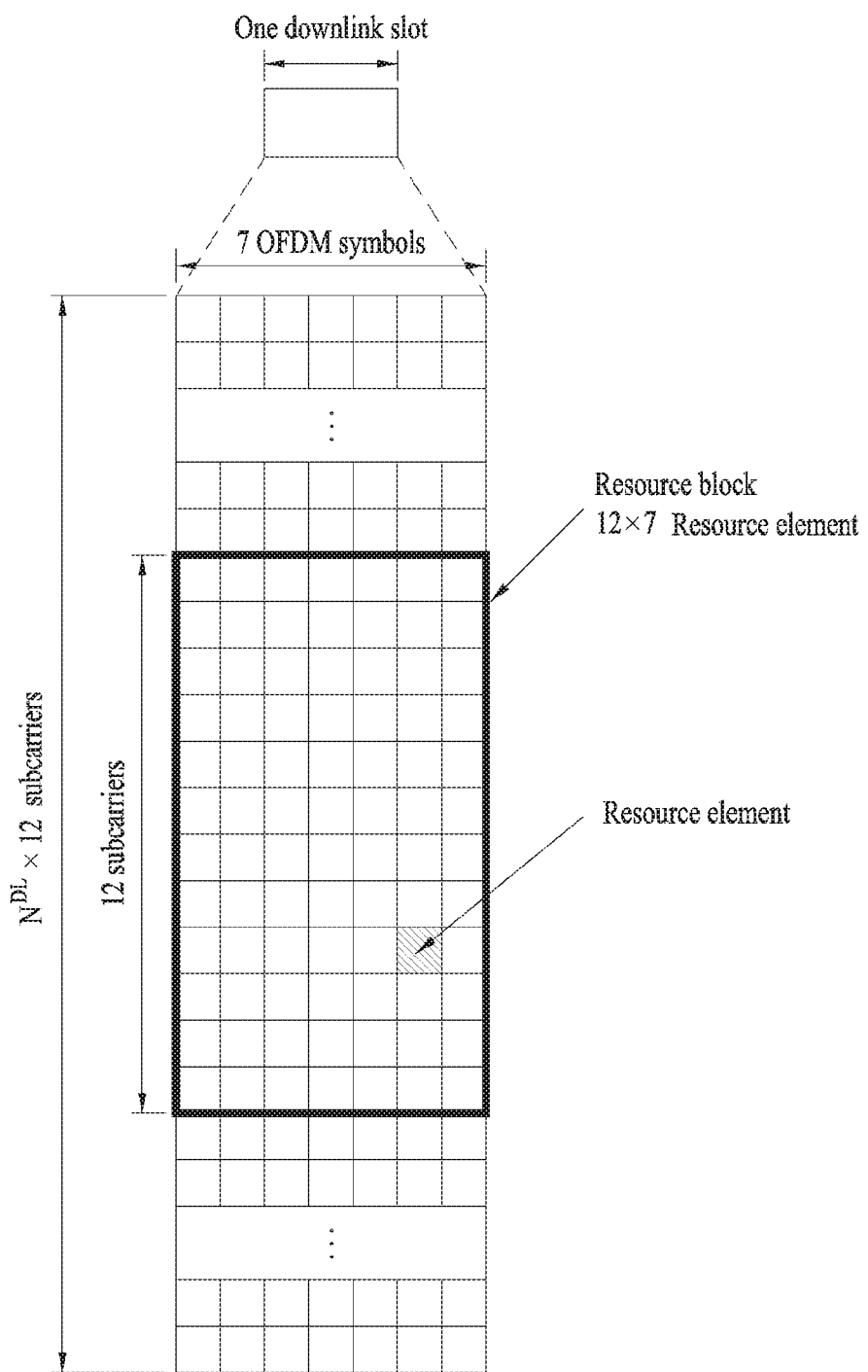
FIG. 2 is a diagram illustrating a resource grid for one downlink (DL) slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number NDL of RBs included in a downlink slot depends on a DL transmission bandwidth. A UL slot may have the same structure as a DL slot.

Figure 3:
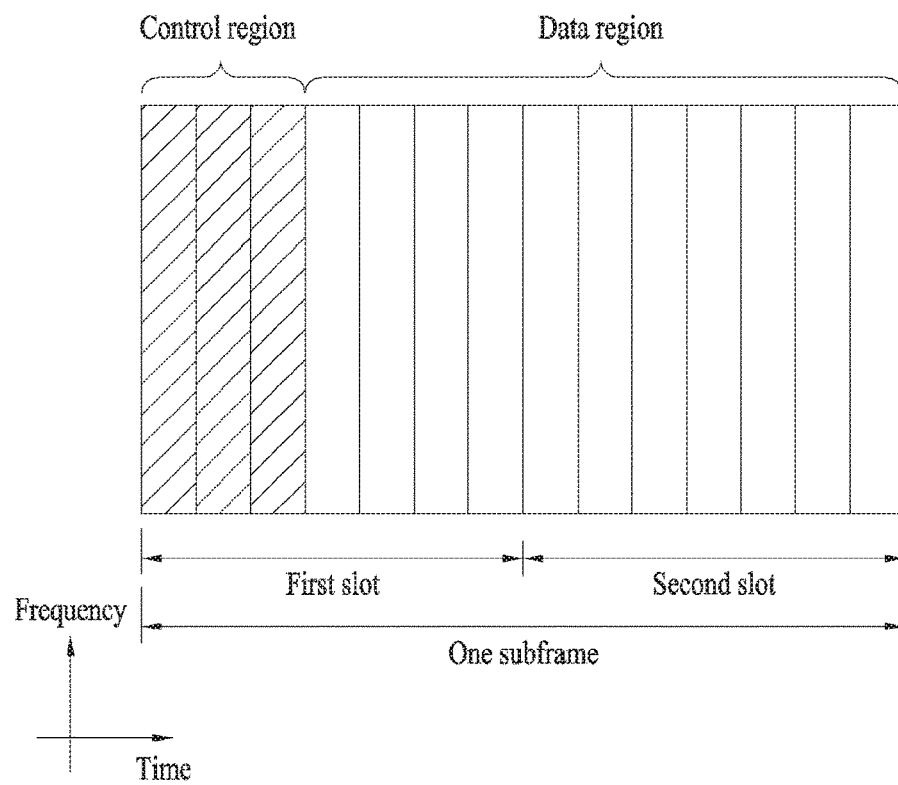
FIG. 3 is a diagram illustrating a DL subframe structure.

FIG. 3 illustrates a DL subframe structure. Up to the first three OFDM symbols of the first slot in a DL subframe are used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about a UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging radio network temporary identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
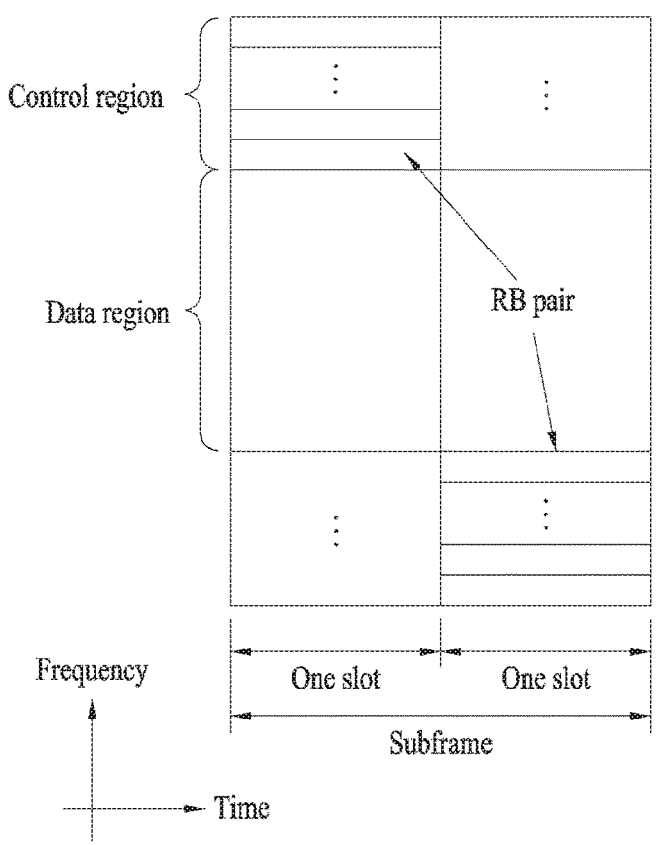
FIG. 4 is a diagram illustrating an uplink (UL) subframe structure.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Reference Signal (RS)

In transmitting packets in a wireless communication system, the packets are transmitted over a radio channel, and therefore signal distortion may occur in the transmission process. For a receiver to receive the correct signal in spite of signal distortion, the received distorted signal should be corrected using channel information. In detecting the channel information, a signal which is known to both the transmitter and the receiver is transmitted and the degree of distortion of the signal received over the channel is used to detect the channel information. This signal is referred to as a pilot signal or a reference signal.

In the case in which data is transmitted and received using multiple antennas, a channel state between a transmit antenna and a receive antenna needs to be identified to receive a correct signal. Accordingly, a separate RS is needed for each transmit antenna and, more particularly, for each antenna port.

RSs may be divided into an UL RS and a DL RS. In the current LTE system, the UL RSs include:

i) a demodulation-reference signal (DM-RS) for channel estimation for coherent demodulation of information transmitted over a PUSCH and a PUCCH; and ii) a sounding reference signal (SRS) for measuring UL channel quality at frequencies of different networks in the BS.

The DL RSs include:

i) a cell-specific reference signal (CRS) shared by all UEs in a cell;

ii) a UE-specific reference signal for a specific UE;

iii) a demodulation-reference signal (DM-RS) transmitted for coherent demodulation in the case of transmission of a PDSCH;

iv) a channel state information-reference signal (CSI-RS) for delivering channel state information (CSI) in the case of transmission of a DL DMRS;

v) a multimedia broadcast single frequency network (MBSFN) reference signal transmitted for coherent demodulation of a signal transmitted in an MBSFN mode, and vi) a positioning reference signal used to estimate geographic position information of a UE.

The RSs may be broadly divided into two reference signals according to the purposes thereof. There are an RS used to acquire channel information and an RS used for data demodulation. Since the former is used when the UE acquires channel information on DL, this RS should be transmitted over a wide band and even a UE which does not receive DL data in a specific subframe should receive the RS. This RS is also applied to situations such as handover. The latter RS is sent by the BS along with a resource on DL. The UE may receive the RS to perform channel measurement to implement data modulation. This RS should be transmitted in a region in which data is transmitted.

The CRS is used for acquisition of channel information and for data demodulation, and the UE-specific RS is used only for data demodulation. The CRS is transmitted in every subframe in a wide band and RSs for up to four antenna ports are transmitted according to the number of transmit antennas of the BS.

For example, if the number of transmit antennas of the BS is 2, CRSs for antenna ports #0 and #1 are transmitted. If the number of transmit antennas of the BS is 4, CRSs for antenna ports #0 to #3 are respectively transmitted.

FIG. 5 is a diagram illustrating a pattern in which CRSs and DRSs defined in a legacy 3GPP LTE system (e.g., Release-8) are mapped to resource block (RB) pairs. A downlink RB pair, as a unit to which an RS is mapped, may be represented as a unit of one subframe in the time domain times 12 subcarriers in the frequency domain. That is, one RB pair has a length of 14 OFDM symbols for a normal CP (FIG. 5(a)) and a length of 12 OFDM symbols for an extended CP (FIG. 5(b)).

FIG. 5 shows locations of RSs on RB pairs in a system in which the BS supports four transmit antennas. In FIG. 5, resource elements (REs) denoted by "0", "1", "2" and "3" represent the locations of the CRSs for antenna port indexes 0, 1, 2 and 3, respectively. In FIG. 5, REs denoted by "D" represent locations of the DMRSs.

Channel State Information-RS (CSI-RS)

The CSI-RS, which is designed for the LTE-A system supporting up to eight antenna ports on downlink, is a reference signal intended for channel measurement. The CSI-RS is different from the CRS which is intended for channel measurement and data demodulation. Accordingly, the CSI-RS does not need to be transmitted in every subframe, unlike the CRS. The CSI-RS is used in transmission mode 9, and the DMRS is transmitted for data demodulation.

More specifically, the CSI-RS may be transmitted through antenna ports 1, 2, 4, and 8. When one antenna port is used, it may be antenna port #15. When two antenna ports are used, they may be antenna ports #15 and #16. When four antenna ports are used, they may be antenna ports #15 to #18. When eight antenna ports are used, they may be antenna ports #15 to #22.

A CSI-RS may be generated using Equation 1 given below.

$$r_{l,n_s}(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, N_{RB}^{max,DL} - 1$$

Equation 1

Herein, $r_{l,n_s}(m)$ denotes a generated CSI-RS, c(i) denotes a pseudo random sequence, $n_s$ denotes the slot number, l denotes an OFDM symbol, and $N_{RB}^{max,DL}$ denotes the maximum number of RBs of a DL bandwidth.

The CSI-RS generated through Equation 1 may be mapped to an RE for each antenna port, using Equation 2.

$$a_{k,l}^{(p)} = w_{l''} \cdot r_{l,n_s}(m')$$

Equation 2

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 2, k' and l' may be determined according to CSI-RS configurations as shown in Table 1.

TABLE 1

| CSI reference signal config-uration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 | | | | | | |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |
| Frame structure type 2 only | | | | | | |
| 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

Figures 6, 7:
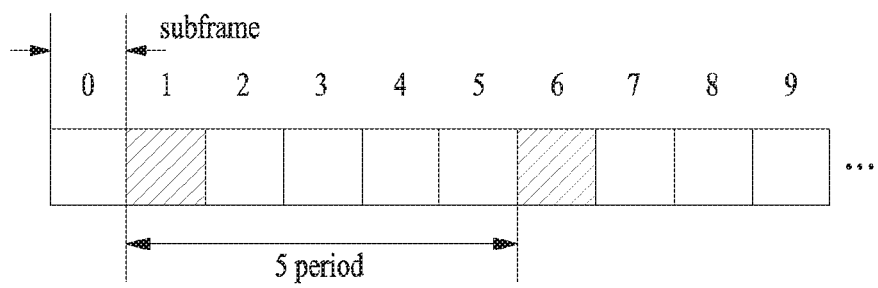
FIG. 6 is a diagram illustrating a channel state information reference signal.
FIGS. 7 to 9 are diagrams illustrating reporting of channel state information.

For a specific CSI-RS according to Equation 2 and Table 1, mapping to REs is performed for each antenna port. FIG. 6 shows mapping of CSI-RSs for each antenna port as described above. In FIG. 6, R0 to R3 respectively represent mapping of CRSs to antenna ports, and the number indications represent mapping of CSI-RSs to antenna ports. For example, REs indicated by numbers 0 and 1 represent mapping of a CSI-RS corresponding to antenna port 0 or 1. In this case, CSI-RSs corresponding to two antenna ports are mapped to the same RE, and may be distinguished by different orthogonal codes.

Next, as described above, the CSI-RS may be transmitted in a specific subframe rather than in every subframe. Specifically, the CSI-RS may refer to CSI-RS subframe configurations as listed in Table 2 given below, and be transmitted in a subframe satisfying Equation 3.

TABLE 2

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

$$(10n_f + \lfloor n_s/2 \rfloor - \Delta_{CSI-RS}) \bmod T_{CSI-RS} = 0 \quad \text{Equation 3}$$

In Table 2, $T_{CSI-RS}$ denotes the period for transmission of a CSI-RS, $\Delta_{CSI-RS}$ is an offset value, $n_f$ denotes a system frame number, and $n_s$ denotes a slot number.

The CSI-RS may be signaled to a UE as a CSI-RS configuration information element, as shown in Table 3.

TABLE 3

```
CSI-RS-Config-r10 ::=        SEQUENCE {
    csi-RS-r10                    CHOICE {
        release                       NULL,
        setup                         SEQUENCE {
            antennaPortsCount-r10         ENUMERATED {an1,
an2, an4, an8},
            resourceConfig-r10            INTEGER (0..31),
            subframeConfig-r10            INTEGER (0..154),
            p-C-r10
INTEGER (-8..15)
        }
    }
}
                        OPTIONAL,        -- Need ON
```

TABLE 3-continued

```
            zeroTxPowerCSI-RS-r10         CHOICE {
                release                              NULL,
                setup                                SEQUENCE {
                    zeroTxPowerResourceConfigList-r10    BIT STRING (SIZE
    (16)),
                    zeroTxPowerSubframeConfig-r10        INTEGER (0..154)
                }
            }
                                    OPTIONAL       -- Need ON
    }
```

In Table 3, 'antennaPortsCount' carries the number (selected among 1, 2, 4, and 8) of antennas through which the CSI-RS is transmitted, 'resourceConfig' carries an RE in which the CSI-RS is positioned in an RB in time-resource frequency, and 'subframeConfig' carries a subframe in which the CSI-RS is transmitted and a CSI-RS EPRE value for PDSCH EPRE. Additionally, the eNB delivers information about a zero power CSI-RS.

In CSI-RS Config, 'resourceConfig' indicates the position at which the CSI-RS is transmitted. This parameter indicates accurate positions of a symbol and a carrier in an RB according to CSI-RS configuration numbers of Table 1 represented as 0 to 31.

Channel State Information (CSI) Feedback

MIMO schemes may be classified into an open-loop MIMO scheme and a closed-loop MIMO scheme. In the open-loop MIMO scheme, a MIMO transmitter performs MIMO transmission without receiving CSI feedback from a MIMO receiver. In the closed-loop MIMO scheme, the MIMO transmitter receives CSI feedback from the MIMO receiver and then performs MIMO transmission. In the closed-loop MIMO scheme, each of the transmitter and the receiver may perform beamforming based on CSI to achieve a multiplexing gain of MIMO transmit antennas. To allow the receiver (e.g., a UE) to feed back CSI, the transmitter (e.g., an eNB) may allocate a UL control channel or a UL-SCH to the receiver.

The CSI feedback may include a rank indicator (RI), a precoding matrix index (PMI), and a channel quality indicator (CQI).

The RI is information about a channel rank. The channel rank indicates the maximum number of layers (or streams) that may carry different information in the same time-frequency resources. Since the rank is determined mainly according to long-term fading of a channel, the RI may be fed back in a longer period than the PMI and the CQI.

The PMI is information about a precoding matrix used for transmission of a transmitter and has a value reflecting the spatial characteristics of a channel. Precoding refers to mapping transmission layers to transmit antennas. A layer-antenna mapping relationship may be determined according to a precoding matrix. The PMI is the index of an eNB precoding matrix preferred by the UE based on a metric such as signal-to-interference-plus-noise ratio (SINR), etc. In order to reduce the feedback overhead of precoding information, the transmitter and the receiver may pre-share a codebook including multiple precoding matrices and only an index indicating a specific precoding matrix in the codebook may be fed back.

In a system supporting an extended antenna configuration (e.g. an LTE-A system), additional acquisition of multi-user (MU)-MIMO diversity using an MU-MIMO scheme is considered. In the MU-MIMO scheme, when an eNB performs downlink transmission using CSI fed back by one UE among multiple users, it is necessary to prevent interference with other UEs from occurring because there is an interference channel between UEs multiplexed in the antenna domain. Accordingly, CSI of higher accuracy than CSI in a single-user (SU)-MIMO scheme should be fed back in order to correctly perform MU-MIMO operation.

A new CSI feedback scheme may be adopted by modifying conventional CSI including an RI, a PMI, and a CQI so as to more accurately measure and report CSI. For example, precoding information fed back by the receiver may be indicated by a combination of two PMIs. One of the two PMIs (a first PMI) has a long-term and/or wideband property, and may be referred to as W1. The other PMI (a second PMI) has a short-term and/or subband property, and may be referred to as W2. A final PMI may be determined by a combination (or a function) of W1 and W2. For example, if the final PMI is denoted by W, W=W1*W2 or W=W2*W1.

The CQI is information indicating channel quality or channel strength. The CQI may be expressed as an index corresponding to a predetermined modulation and coding scheme (MCS) combination. That is, a CQI index that is fed back indicates a corresponding modulation scheme and code rate. In general, the CQI has a value reflecting a reception SINR that can be achieved when an eNB configures a spatial channel using a PMI.

The CSI feedback scheme is divided into periodic reporting over a physical uplink control channel (PUCCH) and aperiodic reporting over a PUSCH, which is an uplink data channel, according to a request from an eNB.

In aperiodic reporting, reporting is configured for UEs by a request bit contained in the UL scheduling information of the eNB. Upon receiving this information, each UE sends channel information considering a transmission mode thereof to the eNB over the PUSCH. In the case of periodic reporting, a period of transmission of channel information and a corresponding offset are signaled to each UE in each subframe through a higher layer signal, and the channel information considring a transmission mode of each UE is sent to the eNB over the PUCCH according to a defined period. If data is transmitted on uplink in the subframe in which the channel information is transmitted according to the defined period, the channel information may be transmitted along with the data over the uplink data channel (PUSCH) rather than the PUCCH.

The periodic reporting of channel information is described in more detail below. The periodic reporting is divided into four reporting modes according to CQI and PMI feedback types as shown in Table 4 below.

TABLE 4

|  |  | PMI Feedback Type | |
| --- | --- | --- | --- |
|  |  | No PMI | Single PMI |
| PUCCH CQI Feedback Type | Wideband (wideband CQI) | Mode 1-0 | Mode 1-1 |
|  | UE Selected (subband CQI) | Mode 2-0 | Mode 2-1 |

The periodic reporting is divided into wideband (WB) CQI and subband (SB) CQI according to CQI feedback types, and is divided into No PMI and single PMI according to whether or not PMI is transmitted. Each UE receives information configured by a combination of a transmission period and an offset through RRC signaling in a higher layer. For example, when the UE receives information containing a combination of a period set to '5' and an offset set to '1', the UE transmits channel information in every five subframes as shown in FIG. 7. In this case, the channel information is transmitted over the PUCCH with a subframe offset placed in the direction in which the subframe index increases from subframe #0. Herein the subframe indexes are combinations of a system frame number ($n_f$) and 20 slot indexes ($n_s$; 0 to 19), and thus may be expressed as $10 \times n_f + \text{floor}(n_s/2)$.

The periodic reporting is divided into one reporting type for transmitting only WB CQI and the other reporting type for transmitting both WB CQI and SB CQI, according to CQI feedback types. In the case of the type for transmitting only the WB CQI, WB CQI information for the entire band is transmitted in subframes corresponding to each CQI transmission period. The transmission period of periodic WB CQI may be set to 2, 5, 10, 16, 20, 32, 40, 64, 80, and 160 ms, or to no transmission. In this case, if PMI needs to be transmitted according to a PMI feedback type in Table 4, PMI information is transmitted together with CQI. In the case of the type for transmitting both WB CQI and SB CQI, WB CQI and SB CQI are alternately transmitted, which will be described with reference to FIG. 8.

Figure 8:
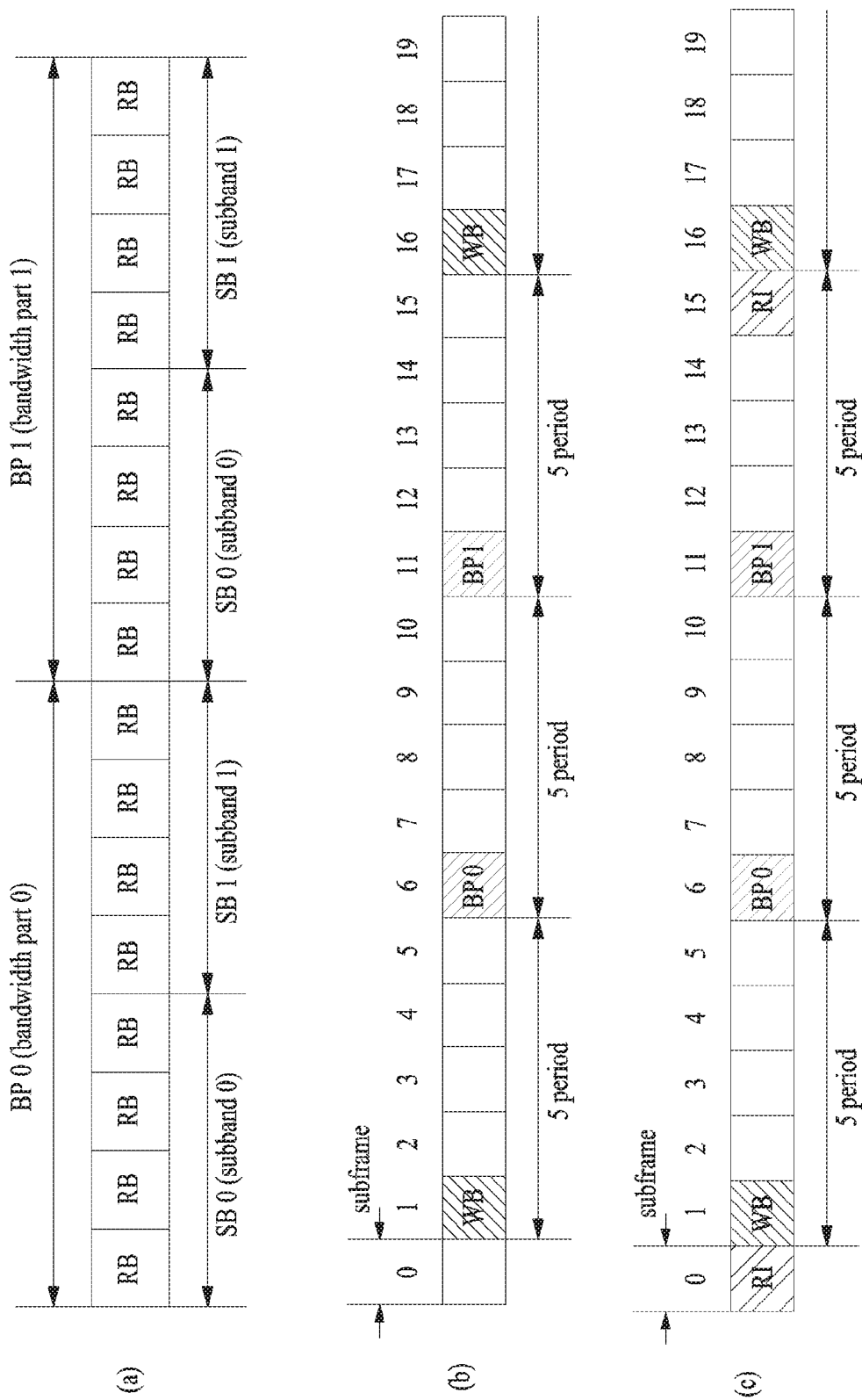

FIG. 8 shows an exemplary system consisting of 16 RBs. The system bandwidth of 16 RBs consists of two bandwidth parts (BPs) (BP0 and BP1), and each BP consists of two subbands (SBs) (SB0 and SB1).

In the case of the type for transmitting both WB CQI and SB CQI, the WB CQI is transmitted in a CQI transmission subframe. In the next transmission subframe, CQI for one SB having a good channel state from among SB0 and SB1 and an index of this SB are transmitted at BP0. In the next transmission subframe, CQI for one SB having a good channel state from among SB0 and SB1 at BP1 and an index of the SB having a good channel state are transmitted. After transmitting the WB CQI, CQI of individual BPs are sequentially transmitted at BP1. In this case, after the WB CQI is transmitted, CQIs for BPs are sequentially transmitted. In this case, the CQIs for BPs located between the WB CQI transmitted and the next WB CQI to be transmitted may be sequentially transmitted one to four times. For example, if the CQI for each BP is transmitted once between two WB CQIs, CQIs are sequentially transmitted in the order of WB CQI, BP0 CQI, BP1 CQI, and WB CQI. In another example, if the CQI about each BP is transmitted four times between the two WB CQIs, CQIs may be transmitted in the order of WB CQI, BP0 CQI, BP1 CQI, BP0 CQI, BP1 CQI, BP0 CQI, BP1 CQI, BP0 CQI, BP1 CQI, and WB CQI. Information about the number of times of sequential transmission is signaled through a higher layer. Regardless of whether the CQI is WB CQI or SB CQI, the information about the number of times of sequential transmission of BP CQI is transmitted over a PUCCH only in a subframe corresponding to the information containing a combination of a period of signaling through the higher layer and an offset. FIG. 8(b) illustrates CQI transmission when information containing a combination of a period set to '5' and an offset set to '1' is signaled to the UE in the case of transmission of both WB CQI and SB CQI. FIG. 8(c) shows RI transmission in addition to CQI transmission of 8(b). In the case of transmission of RI, RI is signaled according to a combination of a transmission period corresponding to a multiple of the WB CQI transmission period and an offset for the transmission period. Herein, the offset is an offset relative to the CQI transmission offset. The offset for RI is defined as 0 or a negative value. For example, if the RI transmission period is one time the WB CQI transmission period, and the offset for RI is '−1', R1 is transmitted in a subframe shown in FIG. 8(c). If the offset for RI is '0' rather than '−1', the transmission subframe of WB CQI overlaps the transmission subframe of RI. In this case, WB CQI is dropped, while RI is transmitted.

In the case of Mode 2-1 in Table 4, two types of periodic reporting may be performed depending on a precoder type indication (PTI) parameter, which is a 1-bit indicator. In this case, W1 and W2 represent the hierarchical codebooks described above. A final precoding matrix W is determined by combining W1 and W2 when W1 and W2 are determined.

More specifically, in the case of Mode 2-1 of periodic reporting, Report 1, Report 2 and Report 3, which correspond to reports of different contents, are transmitted according to different repetition periods. Specifically, in the case of Report 1, RI and a 1-bit PTI value are reported. In the case of Report 2, WB W1 (when PTI=0) or WB W2 and WB CQI (when PTI=1) are reported. In the case of Report 3, WB W2 and WB CQI (when PTI=0), or SB W2 and SB CQI (when PTI=1) are reported.

Report 2 and Report 3 are transmitted in a subframe having an index satisfying $(10 \cdot n_f + \text{floor}(n_s/2) - N_{offset,CQI}) \bmod (N_{pd}) = 0$. Herein, $N_{offset,CQI}$ denotes an offset value described above, $N_{pd}$ denotes a subframe interval between Report 2 or Report 3 and neighboring Report 2 or Report 3. Particularly, a subframe whose index satisfies $(10 \cdot n_f + \text{floor}(n_s/2) - N_{offset,CQI}) \bmod (H \cdot N_{pd}) = 0$ may be designated as a transmission position of Report 2. In this case, Report 2 is transmitted at every $H \cdot N_{pd}$ interval, and subframes between neighboring Reports 2 are used to transmit Report 3. Herein, $H = J \cdot K + 1$ when PTI=1, and H=M when PTI=0. J is the number of BPs, and K, and M have values determined by higher layer signaling.

Report 1 is transmitted in a subframe whose index satisfies $(10 \cdot n_f + \text{floor}(n_s/2) - N_{offset,CQI} - N_{offset,RI}) \bmod (M_{R1} \cdot (J \cdot K + 1) \cdot N_{pd}) = 0$. Herein, $M_{R1}$ has a value determined by higher layer signaling, and $N_{offset,RI}$ corresponds to an offset value of Report 1.

Figure 9:
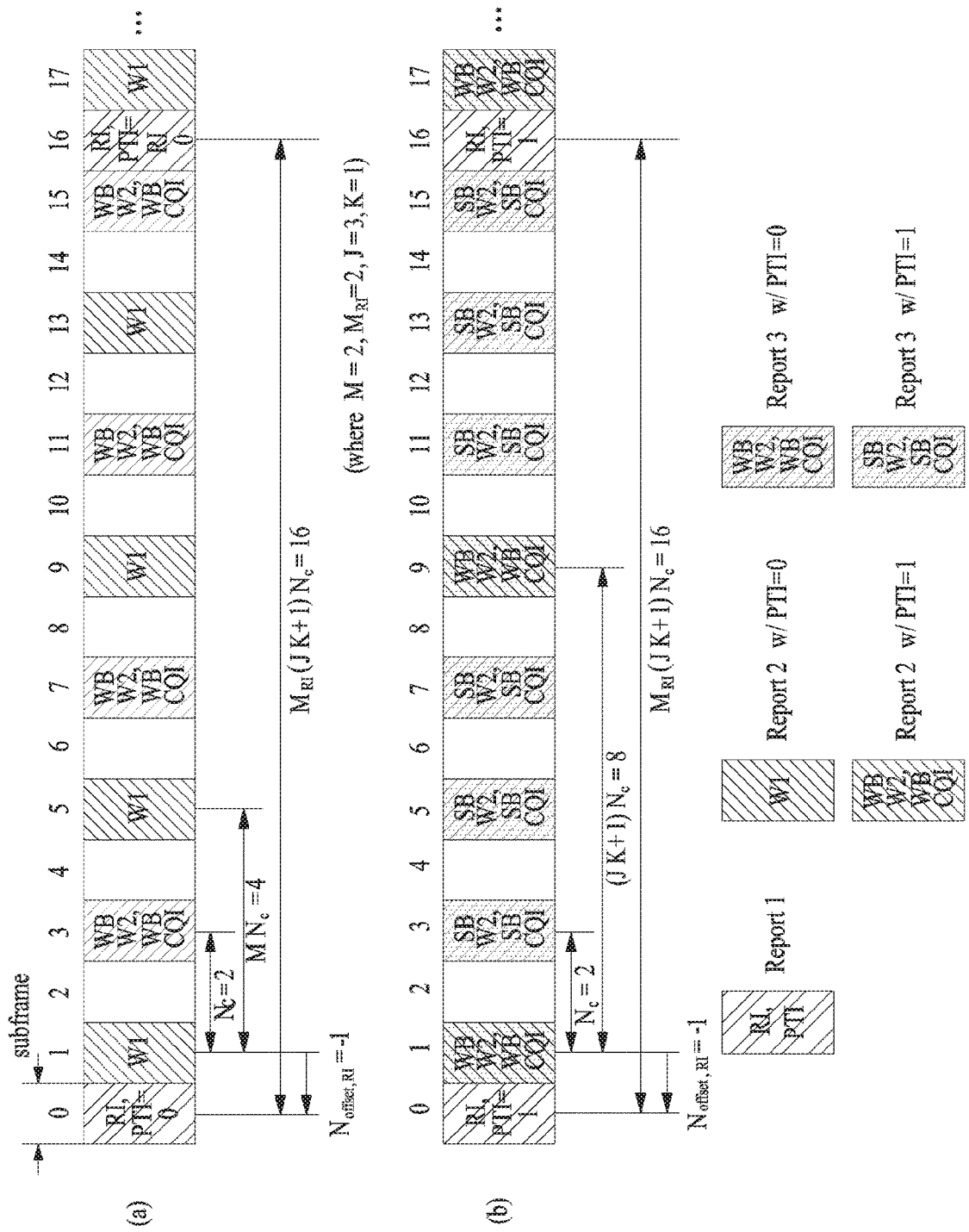

FIG. 9 illustrates two types of periodic reporting according to the aforementioned PTI parameter. Specifically, FIG. 9(a) illustrates a case of PTI=1, and FIG. 9(b) illustrates a case of PTI=0. In FIG. 9, it is assumed that $N_{pd}=2$, $N_{offset,CQI}=1$, M=2, J=3, and K=1. It is also assumed that $M_{RI}=2$, and $N_{offset,RI}=-1$. Thereby, the transmission time of Report 1 does not overlap the transmission time of Report 2. Accordingly, at the time when Report 2 and Report 3 are all transmitted after Report 1 with PTI=0, W1 and W2 are all reported and thus the eNB may recognize final W.

Heterogeneous Deployments

Figure 10:
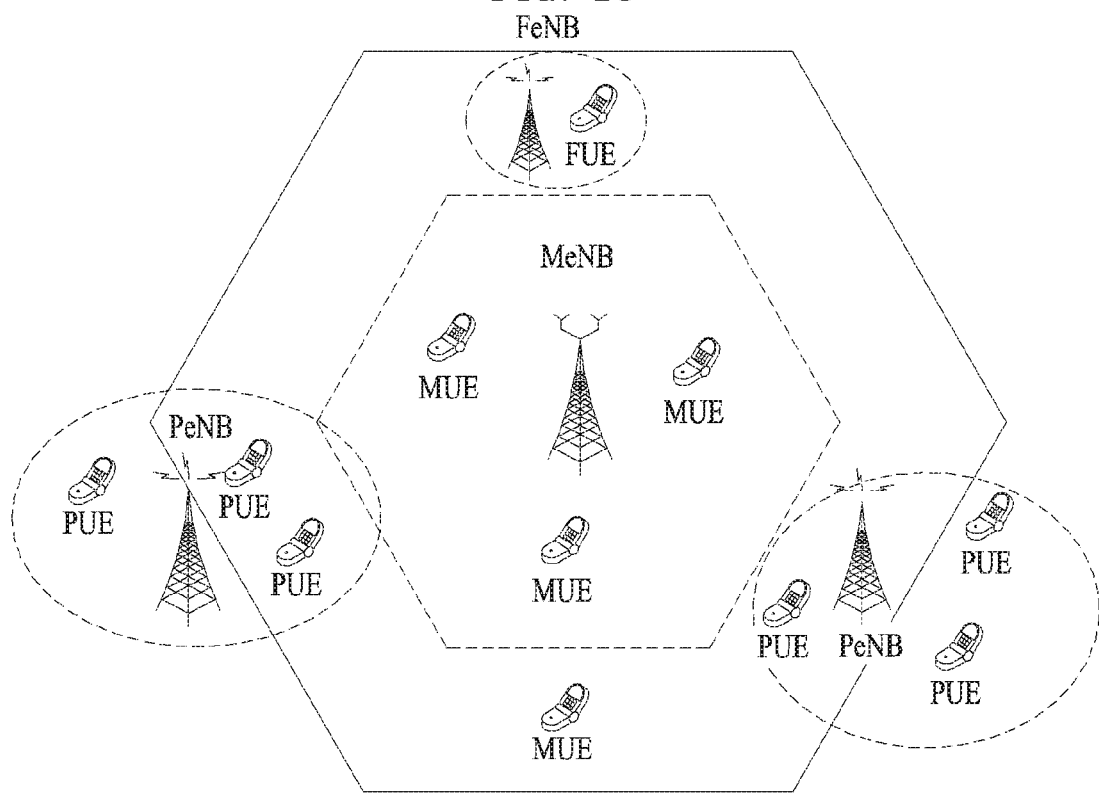
FIG. 10 is a diagram illustrating a heterogeneous network environment.

FIG. 10 illustrates a heterogeneous network wireless communication system including a macro eNB (MeNB) and micro eNBs (PeNBs or FeNBs). The term "heterogeneous network" employed in this specification refers to a network in which an MeNB and a PeNB or FeNB coexist even while they use the same radio access technology (RAT).

The MeNB is a normal eNB of a wireless communication system having wide coverage and high transmission power. The MeNB may be referred to as a macro cell.

The PeNB or FeNB may be referred to as, for example, a micro cell, pico cell, femto cell, home eNB (HeNB), relay, etc. (the exemplified PeNB or FeNB and MeNB may be collectively referred to as transmission points (TPs)). The PeNB or FeNB, a micro version of the MeNB, can independently operate while performing most functions of the MeNB. The PeNB or FeNB is a non-overlay type eNB that may be overlaid in an area covered by the MeNB or in a shadow area that is not covered by the MeNB. The PeNB or FeNB may cover a smaller number of UEs while having a narrower coverage and lower transmission power than the MeNB.

A UE (hereinafter, referred to as a macro-UE (MUE)) may be directly served by the MeNB or a UE (hereinafter, referred to as a micro-UE) may be served by the PeNB or FeNB. In some cases, a PUE present in the coverage of the MeNB may be served by the MeNB.

PeNBs or FeNBs may be classified into two types according to whether UE access is limited.

The first type is an open access subscriber group (OSG) or non-closed access subscriber group (non-CSG) eNB and corresponds to a cell that allows access of the existing MUE or a PUE of a different PeNB. The existing MUE can handover to the OSG type eNB.

The second type is a CSG eNB which does not allow access of the existing MUE or a PUE of a different PeNB. Accordingly, handover to the CSG eNB is impossible.

Coordinated Multi-Point (CoMP)

To satisfy enhanced system performance requirements for the 3GPP LTE-A system, CoMP transmission and reception technology (also called co-MIMO, collaborative MIMO or network MIMO) has been proposed. The CoMP technology may increase the performance of UEs located at a cell edge and the average sector throughput.

In a multi-cell environment with a frequency reuse factor of 1, the performance of a UE located at a cell edge and average sector throughput may be lowered due to inter-cell interference (ICI). To attenuate ICI, the legacy LTE/LTE-A system has adopted a simple passive technique such as fractional frequency reuse (FFR) based on UE-specific power control such that a UE located at a cell edge may have appropriate throughput performance in an environment constrained by interference. However, attenuating the ICI or reusing ICI as a desired signal for the UE may be more desirable than lowering use of frequency resources per cell. To this end, a CoMP transmission technique may be employed.

CoMP schemes applicable to downlink may be broadly classified into joint processing (JP) and coordinated scheduling/beamforming (CS/CB).

According to the JP scheme, data can be used by each transmission point (eNB) of a CoMP cooperation unit. The CoMP cooperation unit refers to a set of eNBs used for a CoMP transmission scheme. The JP scheme may be further divided into joint transmission and dynamic cell selection.

Joint transmission refers to a technique of simultaneously transmitting PDSCHs from a plurality of transmission points (a part or the entirety of a CoMP cooperation unit). That is, a plurality of transmission points may simultaneously transmit data to a single UE. With the joint transmission scheme, the quality of a received signal may be coherently or non-coherently improved, and interference with other UEs may be actively eliminated.

Dynamic cell selection is a technique of transmitting a PDSCH from one transmission point (of a CoMP cooperation unit) at a time. That is, one transmission point transmits data to a single UE at a given time point, while the other transmission points in the CoMP cooperation unit do not transmit data to the UE at the time point. A transmission point to transmit data to a UE may be dynamically selected.

Meanwhile, in the CS/CB scheme, CoMP cooperation units may cooperatively perform beamforming for data transmission to a single UE. While data is transmitted to the UE only from a serving cell, user scheduling/beamforming may be determined through coordination of cells of the CoMP cooperation units.

In the case of uplink, CoMP reception refers to reception of a signal transmitted through cooperation among a plurality of geographically separated transmission points. CoMP schemes applicable to uplink may be classified into joint reception (JR) and coordinated scheduling/beamforming (CS/CB).

The JR scheme indicates that a plurality of reception points receives a signal transmitted through a PUSCH. The CS/CB scheme indicates that only one point receives a PUSCH, and user scheduling/beamforming is determined by coordination of the cells of the CoMP unit.

With a CoMP system as above, multi-cell base stations may jointly support data for a UE. In addition, the base stations may simultaneously support one or more UEs using the same radio frequency resources, thereby increasing system performance. Moreover, a base station may perform space division multiple access (SDMA) based on CSI between the UE and the base station.

In the CoMP system, a serving eNB and one or more cooperative eNBs are connected to a scheduler over a backbone network. The scheduler may receive channel information about the channel states between each UE and cooperative eNBs measured and fed back by the cooperative eNBs over the backbone network, and operate based on the channel information. For example, the scheduler may schedule information for a cooperative MIMO operation for the serving eNB and the one or more cooperative eNBs. That is, the scheduler may directly give each eNB a command to perform the cooperative MIMO operation.

As noted from the above description, it can be said that the CoMP system operates as a virtual MIMO system by grouping a plurality of cells into one group. Basically, the CoMP system may adopt a MIMO communication scheme employing multiple antennas.

FIG. 11 illustrates a CoMP cluster. A CoMP cluster refers to a CoMP cooperation unit mentioned above. FIG. 11(a) illustrates a case in which cells in a CoMP cluster use different physical cell IDs (PCIDs), and FIG. 11(b) illustrates a case in which cells in a CoMP cluster use the same PCID. Even in the case that the cells use the same PCID in a CoMP cluster, the CoMP clusters (CoMP clusters A, B in FIG. 11(b)) may use different PCIDs, and the cells in a single cluster may be configured in the form of a distributed antenna of an eNB or an RRH by sharing a PCID. In a variation, some of the cells in a cluster may share a PCID.

If the cells share the PCID, all the cells having the same PCID may transmit a common signal such as a primary synchronization signal (PSS)/secondary synchronization signal (SSS), a CRS, a PBCH, or a CRS-based PDCCH/PDSCH at the same time. Thereby improving quality of received signals and removing the communication shadow area. Alternatively, some cells having higher transmission power than may transmit a common signal among the cells having the same PCID, and the other cells may not transmit a common signal. However, in the case of unicast data transmission through a CSI-RS, a UE-specific RS and a UE-specific RS-based PDSCH, each cell may individually perform transmission, and have a cell splitting gain.

Hereinafter, description will be given of a CSI-RS transmission scheme proposed in the present invention and a CSI reporting method for a UE using the same, based on the descriptions given above. In the description below, one or more CSI processes per serving cell may be configured for a UE. Specifically, a plurality of CSI processes associated with a channel measurement-related CSI-RS resource configuration and an interference measurement-related CSI-IM (Interference Measurement) resource configuration may be configured for a UE. Herein, a CSI-RS resource configuration may correspond to either a case in which subframes have the same channel characteristics or a case in which subframes have different/variable channel characteristics. The former may be referred to as a periodic CSI-RS, continuous CSI-RS, or fixed beam CSI-RS, and the latter may be referred to as an aperiodic CSI-RS, instantaneous CSI-RS, or adaptive beam CSI-RS. A CSI-IM resource (or interference measurement resource (IMR)) configuration may correspond to either a case in which subframes have the same channel characteristics or a case in which subframes have different/variable channel characteristics. The former may be referred to as a periodic IMR, continuous IMR, fixed beam IMR or fixed property IMR, and the latter may be referred to as an aperiodic IMR, instantaneous IMR, adaptive beam IMR or adaptive property IMR.

As briefly mentioned above, a periodic CSI-RS/IMR and a aperiodic CSI-RS/IMR may be distinguished from each other according to whether subframes have the same channel/interference characteristics or different/variable channel/interference characteristics. The different/variable channel/interference characteristics may mean that an antenna virtualization matrix is not constantly maintained in a subframe corresponding to each configuration in 3D MIMO or massive MIMO.

Hereinafter, 3D MIMO and antenna virtualization matrices related to one embodiment of the present invention will be described with reference to FIG. 12. If the number of transmit antennas increases for 3D MIMO in the pattern of 16 ports, 32 ports, 64 ports, and the like, the number of REs used for CSI-RS transmission for CSI measurement significantly increases, resulting in increase of overhead. For example, when CSI-RSs are transmitted through 64 antenna ports, 64 REs are needed among 168 REs of a subframe, which means 38% of resources are needed for CSI-RS transmission. This is a significant overhead even if it is considered that the CSI-RS is not transmitted in every subframe. Further, when multiple CSI-RS configurations are established in consideration of transmission through cooperation between multiple cells or a zero-power CSI-RS configuration is used for REs on which CSI-RSs of neighboring cells are transmitted, CSI-RS-associated overhead may significantly increase. This problem may be solved by multiple antenna virtualization matrices.

More specifically, CSI-RSs for M ports among N ports may be UE-specifically and aperiodically transmitted, which is a variation of cell-specific and periodic transmission of the CSI-RSs for N ports in resources corresponding to one CSI-RS configuration (Herein, M, which is less than or equal to N, may be differently configured for each UE and vary with time for a specific UE). In other words, in a cell configured with N antenna ports, only M dimensions may be arranged among N dimensions in a manner of UE-dedicated beam and CSI for the same may be fed back, rather than transmitting CSI-RSs for all N dimensions of the spatial domain and receiving feedback of CSI. To this end, M antenna ports may be selected and used among N antenna ports, or mapping between CSI-RSs of N antenna ports and M UE-specific ports or antenna virtualization may be performed using a transform matrix B of N*M dimensions.

Figure 12:
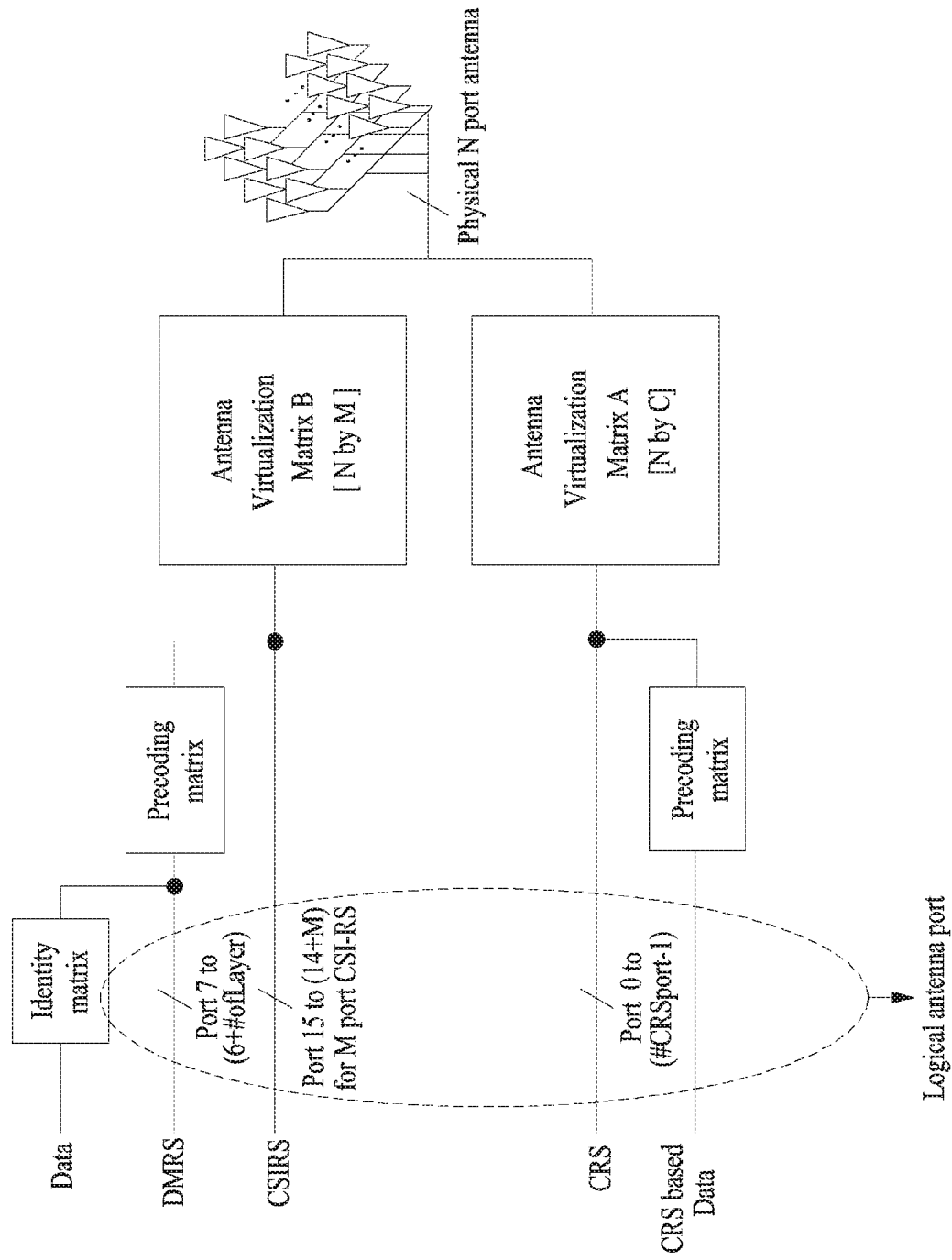
FIG. 12 is a diagram illustrating 3D MIMO and antenna virtualization matrices related to one embodiment of the present invention.

FIG. 12 conceptually shows such antenna virtualization. In FIG. 12, a CSI-RS uses M antenna ports, and the CRS uses C antenna ports. As shown in FIG. 12, N by M antenna virtualization matrix B is used for CSI-RS transmission, the matrix may be designated/configured for each UE. In contrast, antenna virtualization matrix A used for CRS transmission is preferably intended for all UEs. If a signal for CSI-RS antenna ports is $X=\text{diag}(x_1 \ x_2 \ldots x_M)$, a signal after antenna virtualization may be represented as $Z=[z_1 \ z_2 \ldots z_N]=B \cdot X$. Herein, $z_i$ denotes a precoding vector for the i-th CSI-RS antenna port. If the signal for the CRS antenna ports is $Y=\text{diag}(y_1 \ y_2 \ldots y_C)$, a signal after antenna virtualization is $V=[v_1 \ v_2 \ldots v_C]^T=A \cdot Y$. Herein, $v_i$ denotes a precoding vector for the i-th CRS antenna port. Finally, transmit signals of the respective antennas may be transmitted by applying different time delays ($\tau_N$, $\tau_C$) as in Equation 4 below in order to frequency-selectively apply antenna virtualization.

$$Z=[z_1(t-\tau_1)z_2(t-\tau_2) \ldots z_N(t-\tau_N)]$$

$$V=[v_1(t-\tau_1)v_2(t-\tau_2) \ldots v_C(t-\tau_C)] \quad \text{Equation 4}$$

The antenna virtualization matrix B is preferably configured so as to maximize the energy of the signal received by a corresponding UE, and may vary depending on the location of the UE. Such antenna virtualization matrix B may be found through an uplink SRS (based on reciprocity of downlink and uplink channels). An SRS and previously reported CSI feedback information may be used to trace an optimum antenna virtualization matrix B according to change of location of the UE and change in the channel environment.

If the antenna virtualization matrix is UE-specific, overhead may increase as the number of UEs increases. Accordingly, the antenna virtualization matrix may be UE-group-specifically used. Specifically, for a group of UEs at similar positions, a representative antenna virtualization matrix B may be selected, UEs of the group may be simultaneously informed of transmission of a CSI-RS, and CSI may be fed back.

As an example of a UE-group-specific configuration, in a cell including N antenna ports, antenna ports may be grouped into antenna groups of M antenna ports such that K (K=N/M or K>N/M) antenna groups are configured. The CSI-RS transmission time and period of K antenna group may be determined according to the number of active UEs designated for the corresponding antenna group and the channel change rate for the corresponding UEs. Regarding transmission overhead, if the antenna group does not include any active UE, the eNB may not transmit the CSI-RS of the antenna group. Herein, grouping may be implemented through an N by M transform matrix B as shown in FIG. 12. In other words, antenna virtualization of N antenna ports and the k-th M port antenna group may be performed through a transform matrix $B_k$. Matrix $B_{k1}$ for the k1-th M-port antenna group and matrix $B_{k2}$ for the k2-th M-port antenna group are preferably configured to satisfy Equation 4 below, i.e., to be orthogonal to each other.

$$B_{k1}{}^T \cdot B_{k2} = 0 \qquad \text{Equation 4}$$

Subsequently, the eNB may let a specific UE report an average receive signal level, i.e., RSRP for each antenna port group to determine an antenna port group suitable to be allocated to the UE. Specifically, the eNB may configure a CSI-RS management set including multiple periodic CSI-RS transmissions, where the respective CSI-RS in the set represent the antenna port group, such that the UE can report RSRP for multiple CSI-RS configurations.

In summary, in a cell including N antenna ports, antenna ports are groups into K (K=N/M or K>N/M) antenna groups of M antenna ports, one CSI-RS transmission resource is allocated to each antenna group. Alternatively, the number of antenna ports in an antenna group may be individually set for each group. Specifically, the eNB establishes K CSI-RS transmission configurations and assigns an antenna virtualization matrix $B_k$ to each configuration such that a CSI-RS virtualized through a corresponding matrix is transmitted. The eNB may inform the UEs of only some CSI-RS transmission configurations efficient for the UEs among K CSI-RS transmission configurations based on the SRS reception state and an RSRP report.

Figure 13:
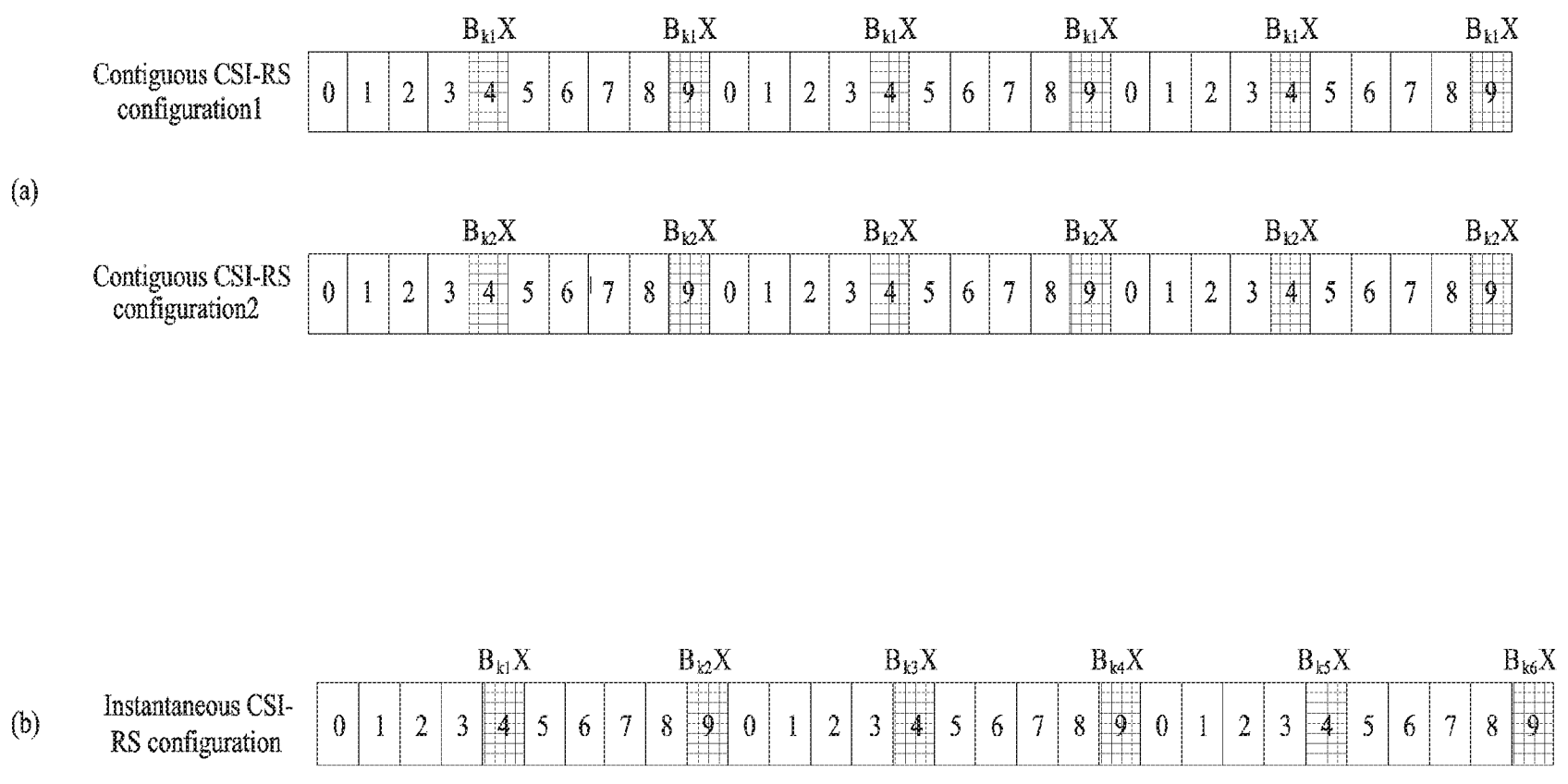

Considering the above description of the periodic CSI-RS/IMR and aperiodic CSI-RS/IMR, the periodic CSI-RS/IMR may mean that the antenna virtualization matrix $B_k$ does not change in the subframes corresponding to the CSI-RS/IMR resource configuration. That is, as shown in FIG. 13(a), $B_{k1}$ for periodic CSI-RS configuration 1 does not change in the subframes corresponding to CSI-RS configuration 1, and $B_{k2}$ for periodic CSI-RS configuration 2 does not change in the subframes corresponding to CSI-RS configuration 2. In addition, the aperiodic CSI-RS/IMR may means that the virtualization matrix $B_k$ changes in subframes corresponding to a resource configuration as shown in FIG. 13(b).

CSI-RS Configuration and Channel Measurement in CSI-RS Resource

Hereinafter, description will be given of a CSI-RS configuration and channel measurement in a CSI-RS resource. In particular, description will be mainly given of an aperiodic CSI-RS configuration (which means that subframes corresponding to a CSI-RS resource configuration according to change of the antenna virtualization matrix have different/variable channel characteristics, as described above).

An eNB may designate a resource region in which a CSI-RS can be transmitted through a cell-specific CSI-RS configuration. In this case, the eNB may be used to inform the UE that the PDSCH is not transmitted in the resource region in which a CSI-RS can be transmitted. The resource region designated through the cell-specific CSI-RS configuration may be divided and used for non-zero power CSI-RS transmission for CSI measurement, for a zero-power CSI-RS configured so as not to interfere with a CSI-RS of a neighboring cell, and/or as an IMR for interference measurement. A cell-specific CSI-RS configuration may include parameters such as subframeConfig, ResourceConfigList, zeroTxPowerResourceConfigList, and zeroTxPowerSubframeConfig. The parameter subframeConfig may indicate a subframe period and a offset by which the CSI-RS is transmitted, and the parameter ResourceConfigList may indicate, through a k-bit bitmap, whether or not k resource regions allowing for transmission of x port CSI-RS in a subframe are configured as cell-specific CSI-RS resources.

Figure 14:
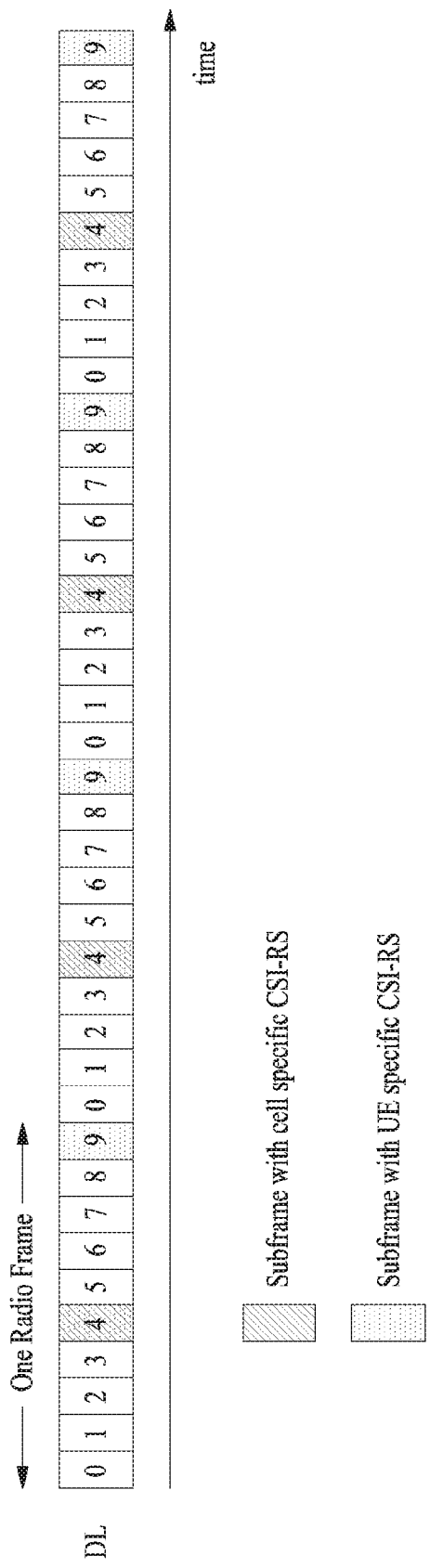
FIG. 14 is a diagram illustrating a cell-specific CSI-RS and a UE-specific CSI-RS according to one embodiment of the present invention.

Additionally, the eNB may designate, through one or more UE-specific aperiodic CSI-RS configurations, a CSI-RS transmission-enabled region for the UE. Herein, a UE-specific aperiodic CSI-RS transmission resource may be a subset of a cell-specific CSI-RS resource, as shown in FIG. 14. If the UE-specific aperiodic CSI-RS is not a subset of a cell-specific CSI-RS, the UE may determine that this is an RRC signaling error, and ignore the UE-specific aperiodic CSI-RS configuration or assume that the PDSCH is not mapped to the UE-specific aperiodic CSI-RS resource. The UE-specific aperiodic CSI-RS configuration may include parameters antennaPortsCount, subframeConfig, resourceConfig, and p-C. The parameter antennaPortsCount defines the number of antenna ports configured for the corresponding UE, the parameter subframeConfig defines a subframe period and an offset by which the CSI-RS is transmitted, the parameter resourceConfig indicates the position of a CSI-RS transmission RE in a subframe, and the parameter p-C indicates a ratio between the PDSCH transmit power and the CSI-RS transmit power.

When the eNB transmits CSI-RS according to cell-specific/UE-specific CSI-RS configurations, channel measurement for corresponding CSI reporting of the UE may be performed as follows.

Figure 15:
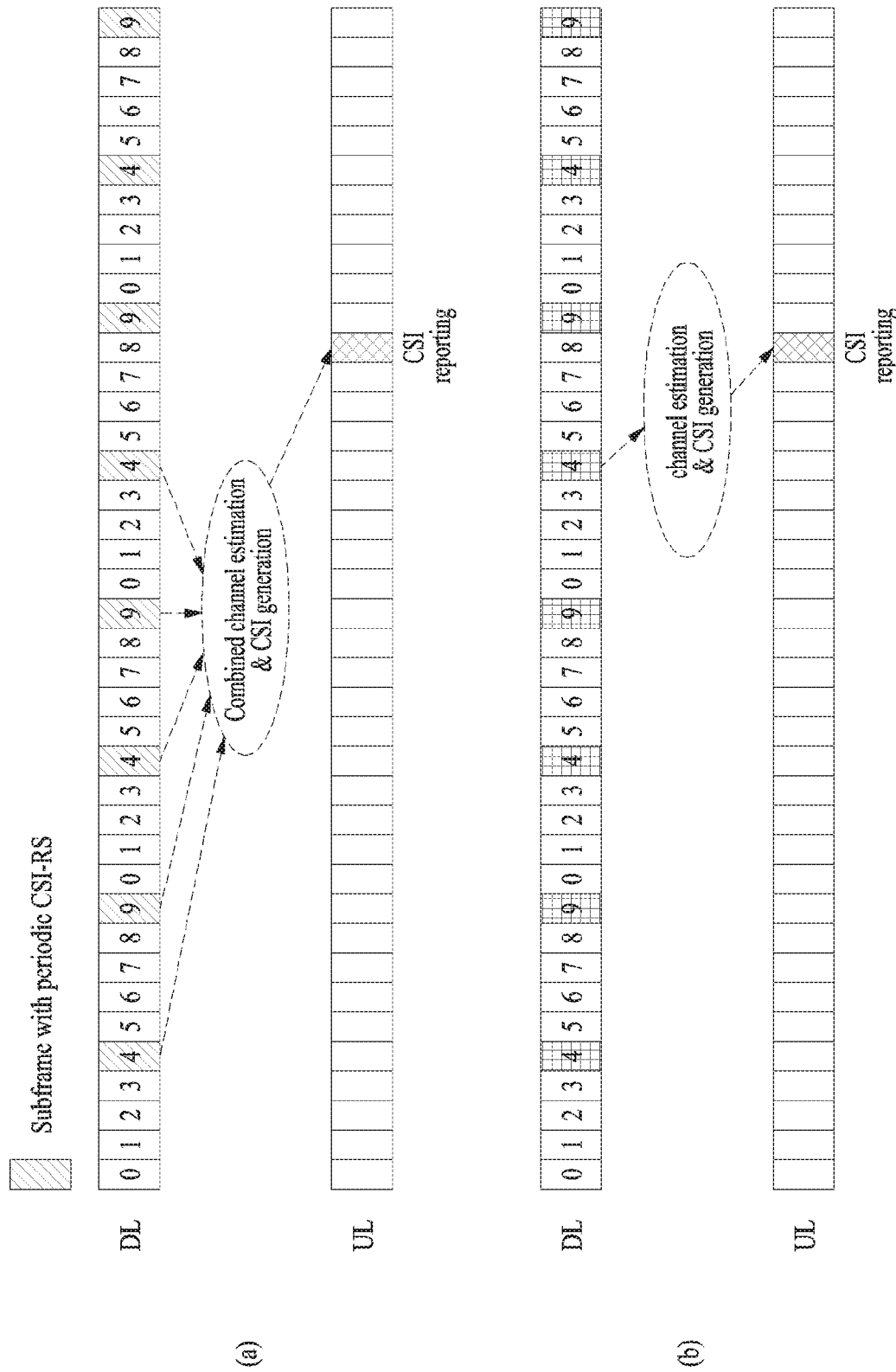
FIG. 15 is a diagram illustrating a channel measurement according to embodiment of the present invention.

In the case of a UE-specific aperiodic CSI-RS configuration, the CSI-RS is not necessarily transmitted through a subframe in which transmission of the CSI-RS is enabled. Further, even if the CSI-RS is transmitted through contiguous subframes, the subframes may have different antenna virtualization matrices of the CSI-RS for the UE. Accordingly, interpolation of the CSI-RS is not performed over contiguous CSI-RS transmission subframes in the process of channel estimation. In other words, in the case of a UE-specific aperiodic CSI-RS configuration, channel estimation may be performed only in a corresponding CSI-RS transmission subframe. Referring to FIG. 15, in the case of a cell-specific CSI-RS configuration, the UE uses, in performing channel measurement, CSI-RS in subframes prior to the subframe in which CSI reporting is to be performed, as shown in FIG. 15(a). In the case of a UE-specific aperiodic CSI-RS configuration, on the other hand, the UE uses, in performing channel measurement, only the CSI-RS in a subframe immediately before the subframe in which CSI reporting is to be performed, as shown in FIG. 15(b). To this end, when the eNB delivers a CSI-RS configuration to the UE, it may also inform of whether the configuration is a periodic configuration or an aperiodic configuration. Alternatively, when the eNB delivers a CSI-RS configuration or a CSI reporting configuration to the UE, it may also inform the UE of whether or not channel estimation results from multiple CSI-RS transmission subframes can be combined for generation of CSI. More specifically, the eNB may inform the UE of the number of previous CSI-RS transmission subframes providing channel estimation results which can be combined for generation of CSI. Herein, the number of CSI-RS transmission subframes which can be used for CSI generation may be defined as a CSI measurement window. If the CSI measurement window is 1, the UE can use only the channel estimation result from a single CSI-RS transmission subframe to perform CSI generation.

In summary, the UE combines, when assigned a periodic CSI-RS, channel estimation results from multiple CSI-RS transmission subframes to generate CSI, while the UE generates, when assigned an aperiodic CSI-RS, CSI in each individual CSI-RS transmission subframe.

A periodic reporting scheme via PUCCH or a non-periodic reporting scheme via PUSCH can be used for CSI based on a measured channel. An eNB can individually set a CSI-RS transmission configuration for the periodic CSI reporting scheme via PUCCH and a non-periodic CSI-RS transmission configuration for the non-periodic CSI reporting scheme via PUSCH to a UE. In this case, CSI for the periodic CSI reporting and CSI for the non-periodic CSI-reporting may be based on a combined channel estimation scheme and a result estimated in a specific subframe, respectively.

Or, channel estimation for the periodic CSI reporting scheme via PUCCH may be performed based on a CRS and channel estimation for the non-periodic CSI reporting scheme via PUSCH can be performed based on a non-periodically transmitted CSI-RS. In this case, an eNB can determine an MCS of a CRS-based PDSCH/PDCCH for a UE via the periodic CSI reporting via PUCCH.

While informing a UE of a plurality of CSI-RS transmission configurations, an eNB can inform the UE of whether each of a plurality of the CSI-RS transmission configurations corresponds to periodic or aperiodic. Periodic CSI-RS transmission configuration can be used for both the periodic CSI reporting scheme via PUCCH and the non-periodic CSI-reporting scheme via PUSCH. On the contrary, aperiodic CSI-RS transmission configuration can be used for the non-periodic CSI reporting scheme via PUSCH only. In particular, when the periodic CSI reporting scheme via PUCCH is configured, the eNB guarantees a CSI-RS for channel measurement to be the periodic CSI-RS transmission configuration.

When an eNB informs a UE of a plurality of CSI-RS transmission configurations, the eNB can designate a CSI measurement window according to each of a plurality of the CSI-RS transmission configurations. A CSI-RS transmission configuration of which the CSI measurement window is greater than 1 can be used for both the periodic CSI reporting scheme via PUCCH and the non-periodic CSI reporting scheme via PUSCH. A CSI-RS transmission configuration of which the CSI measurement window corresponds to 1 can be used for the non-periodic CSI reporting scheme via PUSCH only. In particular, when the periodic CSI reporting scheme via PUCCH is configured, the eNB guarantees a CSI-RS for channel measurement of which the CSI measurement window is greater than 1.

Dynamic Change of CSI-RS Configuration and Notification

In the following, in case of an adaptive CSI-RS transmission scheme aperiodically and dynamically changing a transmission beam direction of an RS to reduce RS transmission overhead in downlink, when a size of a transmission area of an adaptive CSI-RS varies according to a system load, a method of varying PDSCH transmission RE mapping in response to the size of the CSI-RS transmission area and a method of efficiently informing a UE of the PDSCH transmission RE mapping are explained.

In the foregoing description, since PDSCH is not mapped to a resource (or zero-power CSI-RS configuration) designated by a cell-specific CSI-RS configuration, a size of a cell-specific CSI-RS resource (or zero-power CSI-RS resource) can be variably operated according to the number of active UEs, a position/distribution of UEs and the number of transmission of CSI-RS which is determined by a channel change rate. In particular, if the number of transmission of a non-periodic CSI-RS transmission becomes greater, the size of the cell-specific CSI-RS resource may be increased. On the contrary, if the number of transmission of the non-periodic CSI-RS transmission becomes smaller, the size of the cell-specific CSI-RS resource may be decreased. In order to change the size of the cell-specific CSI-RS resource, a cell-specific CSI-RS configuration should be reconfigured. In this case, if the cell-specific CSI-RS configuration is reconfigured, since RRC signaling overhead and/or delay occurs, it may be not efficient. In order to supplement this, it may be able to inform of a position to which a non-periodic CSI-RS is transmittable in advance via the cell-specific CSI-RS configuration (or zero-power CS-RS configuration) and may be then able to dynamically designate whether a CSI-RS is transmitted at the position or PDSCH is transmitted at the position via PDCCH/E-PDCCH. And, when an eNB does not map PDSCH to a resource by setting a zero-power CSI-RS in order not to interfere the resource transmitting a CSI-RS of the neighboring eNB, since a size and a position of the resource, which is configured by the zero-power CSI-RS by the eNB, vary according to a change of a cell-specific CSI-RS configuration of the neighboring eNB, it may be able to dynamically designate whether a CSI-RS is transmitted to a candidate position of the zero-power CSI-RS or PDSCH data is transmitted at the candidate position of the zero-power CSI-RS via PDCCH/E-PDCCH. In particular, in order not to interfere a resource to which a CSI-RS is dynamically transmitted and a resource to which a dynamic CSI-RS of the neighboring eNB is transmitted, all resources to which PDSCH is not mapped are configured as a zero-power CSI-RS candidate region and it may be able to dynamically inform of a zero-power CSI-RS region applied to RE mapping of currently transmitted PDSCH via PDCCH/E-PDCCH including PDSCH scheduling information. In order for an eNB to make a resource transmitting a non-zero power CSI-RS not to be interfered by a neighboring eNB, the eNB informs the neighboring eNB of whether a size and a position of the resource transmitting the non-zero power CSI-RS is changed via X2 interface signaling. Or, the eNB may request the neighboring eNB to configure a zero-power CSI-RS in a resource of a prescribed size and a position via X2 interface signaling.

And, in case of separately/additionally a cell-specific aperiodic CSI-RS configuration is configured with the cell-specific CSI-RS configuration, an eNB can inform of whether a cell-specific aperiodic CSI-RS is transmitted on a corresponding subframe together with PDSCH via a prescribed field. In this case, the prescribed field can be defined as a PRI (PDSCH RE mapping indicator). The PRI can be included in DCI, which is delivered via PDCCH/E-PDCCH including PDSCH scheduling information. In particular, the eNB can inform of whether PDSCH is mapped to REs, which are designated by the cell-specific aperiodic CSI-RS configuration, via the PRI field. In this case, the cell-specific aperiodic CSI-RS configuration can be called an additional zero-power (AZP) CSI-RS configuration or a flexible zero-power CSI-RS configuration. The AZP CSI-RS configuration can be RRC signaled together with the zero-power CSI-RS configuration and may be able to include zeroTxPowerResourceConfigList and/or zeroTxPowerSubframeConfig. For instance, as shown in Table 5 in the following, AZP CSI-RS configuration (CSI-RS-Config2-r12) is added to a legacy cell-specific CSI-RS configuration (CSI-RS-Config-r10) and can be RRC signaled in such a form as an information element shown in Table 5. In particular, zeroTxPowerResourceConfigList can be transmitted via RRC signal together with zeroTxPowerResourceConfigList (zeroTxPowerResourceConfigList-r10 BIT STRING (SIZE (16))) for a terminal is not configured with which a transmission mode 10 (e.g., a terminal supporting release 10 and below or a terminal which is not configured with the transmission mode 10 while supporting release 11 and over).

TABLE 5

```
-- ASN1START
CSI-RS-Config-r10 ::=          SEQUENCE {
    csi-RS-r10                     CHOICE {
        release                        NULL,
        setup                          SEQUENCE {
            antennaPortsCount-r10          ENUMERATED {an1, an2, an4, an8},
            resourceConfig-r10             INTEGER (0..31),
            subframeConfig-r10             INTEGER (0..154),
            p-C-r10                        INTEGER (-8..15)
        }
    }                                                                          OPTIONAL,    -- Need ON
    zeroTxPowerCSI-RS-r10          CHOICE {
        release                        NULL,
        setup                          SEQUENCE {
            zeroTxPowerResourceConfigList-r10 BIT STRING (SIZE (16)),
            zeroTxPowerSubframeConfig-r10     INTEGER (0..154)
        }
    }                                                                          OPTIONAL     -- Need ON
}
CSI-RS-Config2-r12 ::=         SEQUENCE {
    zeroTxPowerCSI-RS-r12          CHOICE {
        release                        NULL,
        setup                          SEQUENCE {
            zeroTxPowerResourceConfigList-r12 BIT STRING (SIZE (16)),
            zeroTxPowerSubframeConfig-r12     INTEGER (0..154)
        }
    }                                                                          OPTIONAL     -- Need ON
}
-- ASN1STOP
```

In the following, a method of dynamically changing a CSI-RS configuration using the AZP CSI-RS configuration and the PRI and a method of informing a UE of the dynamically changed CSI-RS configuration are described with reference to each embodiment. In each embodiment in the following, it may be able to configure AZP CSI-RS in addition to a legacy ZP CSI-RS configuration. In this case, PDSCH may not be mapped to a ZP CSI-RS or an AZP CSI-RS transmission resource.

Embodiment 1-1 (AZP CSI-RS (Z Number of ResourceConfigList)+Z Bit PRI)

A UE receives a zeroTxPowerResourceConfigList for a terminal which is not configured with a transmission mode 10 and one or more (Z number) zeroTxPowerResourceConfigLists (via RRC information element) and receives DCI including a PRI. Subsequently, the UE can identify/recognize/assume whether PDSCH is mapped to REs to which a CSI-RS is transmittable using one or more zeroTxPowerResourceConfigLists and the PRI. The present embodiment assumes that zeroTxPowerSubframeConfig is not transmitted (Or, zeroTxPowerSubframeConfig is not included in RRC signaling for AZP CSI-RS configuration or corresponds to null). If the zeroTxPowerSubframeConfig is included in RRC signaling for AZP CSI-RS configuration, it may correspond to a case of not using this field. In particular, since the zeroTxPowerSubframeConfig is not transmitted/nulled when RRC is configured, if there is a separate indication, the AZP CSI-RS can be transmitted to all subframes. In the following embodiments including embodiment 1-1, assume that the zeroTxPowerSubframeConfig is not transmitted/nulled as mentioned in embodiment 1-1 unless stated otherwise.

Each bit of a PRI may sequentially indicate whether one or more zeroTxPowerResourceConfigLists are applied and a zeroTxPowerResourceConfigList may correspond to a bit-map. Each bit of the zeroTxPowerResourceConfigList may indicate whether PDSCH is mapped to REs corresponding to X-port (in this case, X may correspond to 2, 4, 8, 16, 32 or 64). RE position to which a CSI-RS is transmittable is assigned to the X-port. For instance, referring to FIG. 16, the zeroTxPowerResourceConfigList may correspond to a bitmap of 10 bits. FIG. 16 shows a case that 3 zeroTxPowerResourceConfigLists are received. In this case, the PRI can indicate whether to apply each zeroTxPowerResourceConfigList using 3 bits (i.e., the number of PRI bits and the number of zeroTxPowerResourceConfigLists may be identical to each other).

If a specific zeroTxPowerResourceConfigList is applied, it indicates that PDSCH is not mapped to REs of X-port, which is set to 1 in a corresponding list. For instance, if a PRI bit corresponds to 110, a first and a second zeroTxPowerResourceConfigList (List 1 and List 2) can be applied. If a bit value corresponds to 1 in a zeroTxPowerResourceConfigList, a UE may be able to assume that PDSCH is not mapped to REs corresponding to an X-port. If two or more zeroTxPowerResourceConfigLists are applied by the PRI, in particular, if there exists two or more bit numbers set to 1 in the PRI, a UE may be able to assume that PDSCH is mapped to REs corresponding to an X-port only, which is set to 0 in all of the two or more zeroTxPowerResourceConfigLists. For instance, if a PRI it corresponds to 111 in FIG. 16, a UE may be able to assume that PDSCH is mapped to REs corresponding to a $7^{th}$ X-port and a $10^{th}$ X-port only. The zeroTxPowerResourceConfigList can be transmitted via RRC signaling and the PRI can be transmitted via PDCCH/E-PDCCH in a manner of being included in DCI. Hence, time taken for changing zeroTxPowerResourceConfigList may be longer than time taken for changing a PRI.

The embodiment 1-1 is explained in terms of an eNB. The eNB informs of Z number of zeroTxPowerResourceConfigLists and assigns Z bit to a PRI field of DCI to inform of whether zeroTxPowerResourceConfigList corresponding to each bit is applied. A zeroTxPowerResourceConfigList corresponds to a bitmap and each bit of the bitmap can indicate whether PDSCH is mapped to REs corresponding to X-port. If a PRI indicates application of two or more zeroTxPowerResourceConfigLists, the eNB can set all bits, which correspond to X-ports corresponding to REs to which PDSCH is mapped, to 0 in the two or more zeroTxPowerResourceConfigLists. In particular, when a plurality of lists are applied, PDSCH is mapped to a specific X-port resource only when 0 is set in all applied lists. And, if PDSCH is not mapped to REs corresponding to X-port, the eNB can set a bit corresponding to the X-port to 1.

Embodiment 1-2 (AZP CSI-RS (Z Number of X-Port ResourceConfig)+Z Bit PRI))

In zeroTxPowerResourceConfigList, positions of Z number of REs to which a zero-power CSI RS is transmittable are designated by X-port unit, Z number of bits are assigned to a PRI field of DCI and may be able to inform of whether each bit is used for CSI-RS transmission or PDSCH transmission by the X-port unit.

FIG. 17 shows an example of a case that zeroTxPowerResourceConfigList (List 1) is configured by a bitmap for 10 X-ports. In the example of FIG. 17, assume that the Z number of bits assigned to the PRI corresponds to 3. In the embodiment, a first bit of the PRI field to which the Z number of bits are assigned can inform of whether REs of a 5$^{th}$ X-port are used for CSI-RS transmission or PDSCH transmission. In a zeroTxPowerResourceConfigList, the number of '1' can be restricted to Z number.

Embodiment 1-3 (AZP CSI-RS (1 ResourceConfigList)+1 Bit PRI))

Embodiment 1-3 corresponds to an embodiment of a case that there exists a single zeroTxPowerResourceConfigList only. Specifically, it is able to designate a plurality of RE positions in which a zero power CSI-RS is transmittable in the zeroTxPowerResourceConfigList in X-port unit and assign 1 bit to a PRI field of DCI to inform of whether all resources, which is capable of transmitting a plurality of zero power CSI-RSs designated in a corresponding subframe, are used for CSI-RS transmission or PDSCH transmission.

Embodiment 1-4 (AZP CSI-RS (2AZ ResourceConfigList)+Z Bit PRI))

It is able to have 2AZ states by assigning Z bits to a PRI field of DCI and individually set zeroTxPowerResourceConfigList for each state. In particular, a plurality of zeroTxPowerResourceConfigLists are designated to AZP CSI-RS configuration and a plurality of the zeroTxPowerResourceConfigLists are mapped to each state of the PRI field. In this case, if zeroTxPowerResourceConfigList is not designated to a first state of the PRI field, it is able to dynamically inform that AZP CSI-RS is not transmitted to a corresponding subframe.

Embodiment 2-1 (AZP CSI-RS (W*2^Z ResourceConfigLists)+Z Bit PRI) According to Subframe)

It is able to inform of zeroTxPowerResourceConfigList according to a subframe in AZP CSI-RS configuration. To this end, it is able to indicate a zeroTxPowerResourceConfigList indicating a position to which an AZP CSI-RS is transmittable according to each subframe among W number of contiguous subframes. A pattern of the position to which the AZP CSI-RS is transmittable can be repeatedly applied in every W number of subframes. In this case, it may be preferable that the W corresponds to 10 or 40. Together with a scheme of informing of an AZP CSI-RS transmission position via a Z-bit PRI field in downlink scheduling DCI, embodiment 2-1 informs a UE of (2^Z−1)*W number of zeroTxPowerResourceConfigLists and enables the UE to identify a position of an AZP CSI-RS mapped to a currently received PDSCH via a subframe index and a PRI value of DCI.

Embodiment 2-2 (AZP CSI-RS (Y*2^Z ResourceConfigLists)+Z Bit PRI) According to Subframe Set)

It may be able to inform of zeroTxPowerResourceConfigList according to a subframe set. More specifically, subframes are divided into Y number of subframe sets and it is able to indicate zeroTxPowerResourceConfigLists indicating a position to which an AZP CSI-RS is transmittable for each subframe set. In the present embodiment, a subframe may belong to a single subframe set only among the Y number of subframe sets or may not belong to any subframe set. Together with a scheme of informing of an AZP CSI-RS transmission position via a Z-bit PRI field in downlink scheduling DCI, embodiment 2-2 informs a UE of (2^Z−1)*Y number of zeroTxPowerResourceConfigLists and enables the UE to identify a position of an AZP CSI-RS mapped to a currently received PDSCH via a subframe set index to which a current subframe belongs thereto and a PRI value of DCI. If the current subframe does not belong to any subframe set, a PRI field may be not included in DCI of PDCCH which is transmitted in the current subframe. Or, if a PRI field is included in DCI of PDCCH, a UE may ignore the PRI field.

Embodiment 3-1 (AZP CSI-RS (ResourceConfigList+SubframeConfig)+PRI)

According to embodiment 3-1, both zeroTxPowerResourceConfigList and zeroTxPowerSubframeConfig are informed to a UE and the UE is able to know a subframe in which an AZP CSI-RS is transmittable. The UE is able to know whether AZP CSI-RS is transmitted in a current subframe via a PRI field of DCI, which is delivered on PDCCH. In this case, similar to a legacy zero-power CSI-RS configuration, the zeroTxPowerSubframeConfig may include information on a period and an offset of the subframe to which the AZP CSI-RS is transmittable. In this case, the period of the subframe in which the AZP CSI-RS is transmittable can be set in every subframe or in every N (≥2) subframe. Whether the period is set or not can be indicated when RRC is signaled.

Embodiment 3-2 AZP CSI-RS (ReourceConfigList+W-Bit Bitmap SubframeConfig)+PRI

ZeroTxPowerSubframeConfig can be informed to a subframe in which AZP CSI-RS is transmittable among W number of contiguous subframes in a form of a bitmap of W-bit. In this case, a pattern of the subframe in which the AZP CI-RS is transmittable is repeatedly applied in every W subframes. It may be preferable that the W corresponds to 10 or 40.

In embodiment 3-1 and 3-2, a PRI field is added to DL scheduling DCI, which is delivered via PDCCH in the subframe in which the AZP CSI-RS is transmittable and indicated by the zeroTxPowerSubframeConfig. On the contrary, the PRI field is omitted in DL scheduling DCI, which is delivered via PDCCH in a subframe in which the AZP CSI-RS is not transmittable. In particular, a length of the DL scheduling DCI transmitted in a subframe in which the AZP CSI-RS is transmittable and a subframe in which the AZP CSI-RS is not transmittable, which is informed by AZP CSI-RS configuration, may vary according to whether the PRI field exists.

Embodiment 3-3 AZP CSI-RS (2^Z ResourceConfigList+Single SubframeConfig)+Z-Bit PRI It is able to have 2^Z states by assigning Z bits to a PRI field of DCI and individually set zeroTxPowerResourceConfigList for each state. In particular, an eNB sets a plurality of zeroTxPowerResourceConfigLists and a single zeroTxPowerSubframeConfig to a UE via RRC signaling, i) informs the UE of a zeroTxPowerResourceConfigList used in a current subframe in a manner of adding a Z-bit PRI field to downlink scheduling DCI, which is delivered via PDCCH in a subframe in which an AZP CSI-RS is transmittable, ii) can omit the PRI field from the DL scheduling DCI, which is delivered via PDCCH in a subframe in which the AZP CSI-RS is not transmittable.

The aforementioned embodiments 1 to 3 may correspond to embodiments applied to a transmission mode 1 to 9 irrespective of CoMP. Embodiment 4 in the following explains a transmission mode 10 associated with CoMP.

Embodiment 4

As a method of dynamically changing a cell-specific CSI-RS or a zero-power CSI-RS region and informing a UE of the cell-specific CSI-RS or the zero-power CSI-RS region, it may use a PQI (PDSCH RE mapping and Quasi-Co-Location indicator) field of a DCI format 2D transmitted in PDCCH/E-PDCCH. In case of transmitting PDSCH for a legacy LTE system, i.e., a TM 10 for a CoMP transmission mode, the PQI field corresponds to a field indicating a CRS and a zero-power CSI-RS mapping pattern which are considered for REs to which the scheduled PDSCH is mapped. The PQI field has 2 bits and may have 4 states. Information shown in the following Table 6 is set to each PQI state via RRC and the information can indicate PDSCH RE mapping and a QCL CSI-RS.

TABLE 6

| crs-PortsCount-r11. |
| crs-FreqShift-r11. |
| mbsfn-SubframeConfigList-r11. |
| csi-RS-ConfigZPId-r11. |
| pdsch-Start-r11. |
| qcl-CSI-RS-ConfigNZPId-r11. |

In the PQI field, among information connected to each PQI state, it is able to configure identical information to be connected to all PQI states except csi-RS-ConfigZPId-r11. In particular, CRS pattern information (crs-PortsCount-r11, crs-FreqShift-r11, mbsfn-SubframeConfigList-r11), PDSCH start OFDM symbol information (pdsch-Start-r11) and QCL information (qcl-CSI-RS-ConfigNZPId-r11) are identically set to all PQI states and a different CSI-RS mapping pattern (csi-RS-ConfigZPId-r11) is designated to each state. And, a zero-power CSI RS mapping pattern connected to an $i^{th}$ PQI state is configured to include a zero-power CSI-RS mapping pattern connected to an (i−1)th PQI state. In particular, as an index of a PQI state is getting bigger, a configuration area of a zero-power CSI-RS connected to the PQI state is configured to be greater. By doing so, it is able to dynamically change a zero-power CSI-RS area in a current subframe via the PQI field.

A transmission period of a zero-power CSI-RS can be informed in a manner of being designated in every subframe. In this case, it is able to inform that a zero-power CSI-RS is not transmitted to a subframe using a first PQI state in a manner of not connecting the zero-power CSI-RS to the first PQI state. By doing so, a zero-power CSI-RS configuration (csi-RS-ConfigZPId-r11) connected to a legacy PQI state can be configured by a zero-power CSI-RS transmission period corresponding to a minimum 1 subframe among 5 subframes, thereby resulting in inefficiency. Hence, if the zero-power CSI-RS transmission period is designated in every subframe, inefficiency can be improved.

In the aforementioned description, if DCI including PRI/PQI is transmitted via E-PDCCH, the E-PDCCH may not be mapped to REs belonging to a union of AZP CSI-RS transmission candidate position patterns. In particular, the E-PDCCH is mapped in a manner of avoiding all candidate positions to which an AZP CSI-RSs is transmittable. In case of informing of an AZP CSI-RS transmission position via a Z-bit PRI field in downlink scheduling DCI, each subframe has the (2^Z−1) number of AZP CSI-RS transmission candidate position patterns. In this case, the E-PDCCH should not be mapped to REs belonging to a union of the (2^Z−1) number of AZP CSI-RS transmission candidate position patterns. Or, an eNB may be able to designate an AZP CSI-RS configuration, which is to be considered in case of mapping the E-PDCCH to REs, in a manner of being different from PDSCH.

Configurations of Devices for Embodiments of the Present Invention

FIG. 14 is a diagram illustrating configuration of a transmit point apparatus and a UE according to one embodiment of the present invention.

Referring to FIG. 14, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 14, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 14 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

Embodiments of the present invention are applicable to various mobile communication systems.

What is claimed is:

1. A user equipment (UE) for receiving downlink signals in a wireless communication system, the UE comprising:
a receiver; and
at least one processor operably coupled to the receiver and configured to:
control the receiver to receive information on a plurality of aperiodic zero-power channel state information reference signal (CSI-RS) resources;
control the receiver to receive a downlink control information (DCI) including a physical downlink shared channel resource element mapping indicator (PDSCH RE mapping indicator or PRI) field used for informing one of the plurality of aperiodic zero-power CSI-RS resources; and
control the receiver to receive a physical downlink shared channel (PDSCH) scheduled by the DCI via first resource elements (REs) in a subframe,
wherein the first REs are determined based on the information on the plurality of aperiodic zero-power CSI-RS resources and the PRI field,
wherein the information on the plurality of aperiodic zero-power CSI-RS resources is received via radio resource control (RRC) signaling,
wherein the DCI is received via a physical downlink control channel (PDCCH) in the subframe;
wherein the at least one processor is further configured to control the receiver to receive a CSI-RS via second REs determined based on the plurality of aperiodic zero-power CSI-RS resources and the PRI field, and
wherein the first REs are determined to exclude the second REs.

2. The UE of claim 1, wherein the information on the plurality of aperiodic zero-power CSI-RS resources is received in a unit of a first periodicity and the DCI is received in a unit of a second periodicity, and
wherein the first periodicity is larger than the second periodicity.

3. A communication device for receiving a downlink signal in a wireless communication system, the communication device comprising:
a memory; and
at least one processor operably coupled to the memory and configured to:
process received information on a plurality of aperiodic zero-power channel state information reference signal (CSI-RS) resources;
process a received downlink control information (DCI) including a physical downlink shared channel resource element mapping indicator (PDSCH RE mapping indicator or PRI) field used for informing one of the plurality of aperiodic zero-power CSI-RS resources; and
process a received physical downlink shared channel (PDSCH) scheduled by the DCI via first resource elements (REs) in a subframe, wherein the first REs are determined based on the information on the plurality of aperiodic zero-power CSI-RS resources and the PRI field, wherein the information on the plurality of aperiodic zero-power CSI-RS resources is received via radio resource control (RRC) signaling, wherein the DCI is received via a physical downlink control channel (PDCCH) in the subframe, wherein the at least one processor is further configured to process a received CSI-RS via second REs determined based on the plurality of aperiodic zero-power CSI-RS resources and the PRI field, and wherein the first REs are determined to exclude the second REs.

4. The communication device of claim 3, wherein the information on the plurality of aperiodic zero-power CSI-RS resources is received in a unit of a first periodicity and the DCI is received in a unit of a second periodicity, and wherein the first periodicity is larger than the second periodicity.

5. A base station (BS) for transmitting downlink signals in a wireless communication system, the BS comprising:

a transmitter; and at least one processor operably coupled to the transmitter and configured to:

control the transmitter to transmit information on a plurality of aperiodic zero-power channel state information—reference signal (CSI-RS) resources;

control the transmitter to transmit a downlink control information (DCI) including a physical downlink shared channel resource element mapping indicator (PDSCH RE mapping indicator or PRI) field used for informing one of the plurality of aperiodic zero-power CSI-RS resources; and control the transmitter to transmit a physical downlink shared channel (PDSCH) scheduled by the DCI via first resource elements (REs) in a subframe, wherein the first REs are determined based on the information on the plurality of aperiodic zero-power CSI-RS resources and the PRI field, wherein the information on the plurality of aperiodic zero-power CSI-RS resources is transmitted via radio resource control (RRC) signaling, wherein the DCI is transmitted via a physical downlink control channel (PDCCH) in the subframe, wherein the at least one processor is further configured to control the transmitter to transmit a CSI-RS via second REs determined based on the plurality of aperiodic zero-power CSI-RS resources and the PRI field, and wherein the first REs are determined to exclude the second REs.

6. The BS of claim 5, wherein the information on the plurality of aperiodic zero-power CSI-RS resources is transmitted in a unit of a first periodicity and the DCI is received in a unit of a second periodicity, and wherein the first periodicity is larger than the second periodicity.

* * * * *